United States Patent
Koo et al.

(10) Patent No.: US 11,789,652 B2
(45) Date of Patent: Oct. 17, 2023

(54) STORAGE DEVICE AND STORAGE SYSTEM INCLUDING THE SAME

(71) Applicant: SAMSUNG ELECTRONICS CO., LTD., Suwon-si (KR)

(72) Inventors: Bum Hoe Koo, Hwaseong-si (KR); Jae Sub Kim, Seoul (KR); Yang Woo Roh, Hwaseong-si (KR); Dong Heon Ryu, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/387,011

(22) Filed: Jul. 28, 2021

(65) Prior Publication Data

US 2022/0156007 A1    May 19, 2022

(30) Foreign Application Priority Data

Nov. 18, 2020  (KR) .................. 10-2020-0154438

(51) Int. Cl.
  *G06F 12/08*    (2016.01)
  *G06F 12/0808*  (2016.01)
  *G06F 12/0815*  (2016.01)
  *G06F 3/06*     (2006.01)

(52) U.S. Cl.
  CPC .......... *G06F 3/0659* (2013.01); *G06F 3/0611* (2013.01); *G06F 3/0683* (2013.01)

(58) Field of Classification Search
  CPC ... G06F 11/08; G06F 11/1402; G06F 11/1425
  USPC ........................................................ 711/100
  See application file for complete search history.

(56) References Cited

U.S. PATENT DOCUMENTS

| | | | |
|---|---|---|---|
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,756,369 B2 | 6/2014 | McKean et al. | |
| 9,367,349 B2 | 6/2016 | Kurihara et al. | |
| 9,395,924 B2 | 7/2016 | Cohen et al. | |
| 9,881,014 B1 * | 1/2018 | Bono | G06F 3/065 |
| 10,038,744 B1 * | 7/2018 | Dagan | H04L 67/1008 |
| 10,235,066 B1 * | 3/2019 | Chen | G06F 3/0619 |
| 10,474,374 B2 | 11/2019 | Choi et al. | |
| 11,157,177 B2 * | 10/2021 | Gazit | G06F 3/067 |

(Continued)

FOREIGN PATENT DOCUMENTS

| | | |
|---|---|---|
| KR | 10-1481898 B1 | 1/2015 |
| KR | 10-1694310 B1 | 1/2017 |
| KR | 10-2019-0040886 A | 4/2019 |

*Primary Examiner* — Mohamed M Gebril
(74) *Attorney, Agent, or Firm* — Lee IP Law, P.C.

(57) ABSTRACT

A storage device includes a non-volatile memory; a plurality of cores; a host interface configured to receive a first set command, an I/O command, and an ADMIN command from a host; and a storage controller including a command distribution module configured to be set to a first state according to the first set command, and distribute the I/O command to the plurality of cores according to the set first state. Each of the plurality of cores may be configured to perform an operation instructed by the I/O command and an operation instructed by the ADMIN command on the non-volatile memory in response to the distributed I/O command.

18 Claims, 19 Drawing Sheets

(56) References Cited

U.S. PATENT DOCUMENTS

| | | | |
|---|---|---|---|
| 2004/0078533 A1* | 4/2004 | Lee | G06F 11/1456 |
| | | | 714/E11.12 |
| 2004/0158566 A1* | 8/2004 | Chong, Jr. | G06F 11/1466 |
| 2011/0233648 A1 | 9/2011 | Seol et al. | |
| 2013/0132612 A1* | 5/2013 | Chiu | G06F 3/064 |
| | | | 710/5 |
| 2014/0372810 A1* | 12/2014 | Na | G06F 11/3433 |
| | | | 714/47.1 |
| 2015/0039815 A1* | 2/2015 | Klein | G06F 3/065 |
| | | | 711/103 |
| 2015/0347025 A1* | 12/2015 | Law | G06F 3/0608 |
| | | | 711/103 |
| 2015/0378621 A1* | 12/2015 | Bruner | G06F 12/0833 |
| | | | 711/114 |
| 2016/0224248 A1* | 8/2016 | Choi | G06F 9/45558 |
| 2017/0024132 A1* | 1/2017 | Jun | G06F 3/0604 |
| 2017/0109092 A1* | 4/2017 | Yoshioka | G06F 3/0607 |
| 2017/0220777 A1* | 8/2017 | Wang | G06F 21/6218 |
| 2017/0250507 A1* | 8/2017 | Harashima | H01R 24/60 |
| 2017/0315878 A1* | 11/2017 | Purohit | G06F 16/24573 |
| 2018/0364945 A1* | 12/2018 | Tseng | G06F 3/0659 |
| 2019/0087225 A1* | 3/2019 | Rozen | G06F 9/505 |
| 2019/0163396 A1* | 5/2019 | Jo | G06F 3/0638 |
| 2019/0294570 A1 | 9/2019 | Singh et al. | |
| 2019/0294715 A1* | 9/2019 | Gupta | G06F 16/17 |
| 2019/0320020 A1* | 10/2019 | Lee | G06F 13/4022 |
| 2019/0369703 A1* | 12/2019 | Tan | G06F 3/0625 |
| 2020/0026653 A1* | 1/2020 | Shveidel | G06F 12/0868 |
| 2020/0349110 A1* | 11/2020 | Shveidel | G06F 16/128 |
| 2021/0216531 A1* | 7/2021 | Shveidel | G06F 16/2365 |
| 2022/0156007 A1* | 5/2022 | Koo | G06F 3/0683 |
| 2022/0221992 A1* | 7/2022 | Shveidel | G06F 3/0653 |

\* cited by examiner

| DWord | Byte 3 | | | | | | | | Byte 2 | | | | | | | | Byte 1 | | | | | | | | Byte 0 | | | | | | | |
|---|---|---|---|---|---|---|---|---|---|---|---|---|---|---|---|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 | 31 | 30 | 29 | 28 | 27 | 26 | 25 | 24 | 23 | 22 | 21 | 20 | 19 | 18 | 17 | 16 |
| 0 | Command Identifier | | | | | | | | | | | | | | | | | | | | | FUSE | | | Opcode | | | | | | | |
| 1 | Namespace Identifier | | | | | | | | | | | | | | | | | | | | | | | | | | | | | | | |
| 2 | | | | | | | | | | | | | | | | | | | | | | | | | | | | | | | | |
| 3 | | | | | | | | | | | | | | | | | | | | | | | | | | | | | | | | |
| 4 | | | | | | | | | | | | | | | | | | | | | | | | | | | | | | | | |
| 5 | | | | | | | | | | | | | | | | | | | | | | | | | | | | | | | | |
| 6 | PRP Entry 1 | | | | | | | | | | | | | | | | | | | | | | | | | | | | | | | |
| 7 | | | | | | | | | | | | | | | | | | | | | | | | | | | | | | | | |
| 8 | PRP Entry 2 | | | | | | | | | | | | | | | | | | | | | | | | | | | | | | | |
| 9 | | | | | | | | | | | | | | | | | | | | | | | | | | | | | | | | |
| 10 | | | | | | | | | | | | | | | | | | | | | | | | | Feature Identifier | | | | | | | | ←2100 |
| 11 | | | | | | | | | | | | | | | | | | | | | | | | | | | | | | | | |
| 12 | | | | | | | | | | | | | | | | | | | | | | | | | | | | | | | | |
| 13 | | | | | | | | | | | | | | | | | | | | | | | | | | | | | | | | |
| 14 | | | | | | | | | | | | | | | | | | | | | | | | | | | | | | | | |
| 15 | | | | | | | | | | | | | | | | | | | | | | | | | | | | | | | | |

STORAGE DEVICE AND STORAGE SYSTEM INCLUDING THE SAME

CROSS-REFERENCE TO RELATED APPLICATION

Korean Patent Application No. 10-2020-0154438, filed on Nov. 18, 2020 in the Korean Intellectual Property Office, and entitled: "Storage Device and Storage System Including the Same," is incorporated by reference herein in its entirety.

BACKGROUND

1. Field

Embodiments relate to a storage device and a storage system including the same.

2. Description of the Related Art

A storage device may be used for various purposes depending on an environment of a storage system or the like. For example, the storage device may be used for gaming purposes, document work, or watching of high-definition video. The storage device may include a multi-core processor to improve the performance of the storage device.

SUMMARY

Embodiments are directed to a storage device, including: a non-volatile memory; a plurality of cores; a host interface configured to receive a first set command, an input/output (I/O) command, and an administrative (ADMIN) command from a host; and a storage controller including a command distribution module configured to be set to a first state according to the first set command, and distribute the I/O command to the plurality of cores according to the set first state. Each of the plurality of cores may be configured to perform an operation instructed by the I/O command and an operation instructed by the ADMIN command on the non-volatile memory in response to the distributed I/O command.

Embodiments are also directed to a storage device, including: a non-volatile memory; and a storage controller configured to receive a first set command from a host at a first time point, configured to perform an operation instructed by an I/O command on the non-volatile memory in response to the I/O command provided from the host, and configured to not perform an operation instructed by an ADMIN command on the non-volatile memory in response to the ADMIN command provided from the host.

Embodiments are also directed to a storage system, including: a host; a first storage device that includes: a first non-volatile memory, a plurality of first cores configured to control the first non-volatile memory, and a first storage controller configured to output a first state including information, in which a first ADMIN command and a first I/O command provided from the host are distributed, to the plurality of first cores in response to a first state command provided from the host; and a second storage device that includes: a second non-volatile memory, a plurality of second cores configured to control the second non-volatile memory, and a second storage controller configured to output a second state including information, in which a second ADMIN command and a second I/O command provided from the host are distributed, to the plurality of second cores in response to a second state command provided from the host. The host may be configured to provide a third I/O command to one of the first storage device and the second storage device on the basis of the first state and the second state.

BRIEF DESCRIPTION OF THE DRAWINGS

Features will become apparent to those of skill in the art by describing in detail example embodiments with reference to the attached drawings in which:

FIG. 21 is a diagram for explaining the state command of FIG. 20;

DETAILED DESCRIPTION

Figure 1:
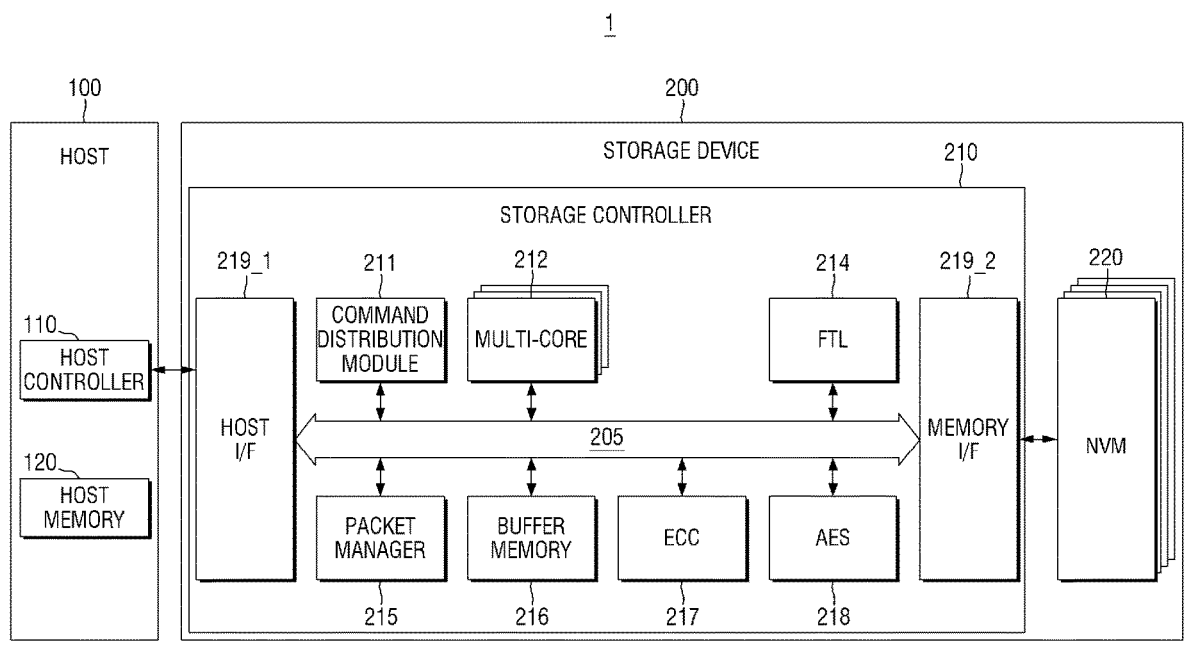
FIG. 1 is a block diagram for explaining a storage system according to some example embodiments.

FIG. 1 is a block diagram for explaining a storage system according to some example embodiments.

Referring to FIG. 1, a storage system 1 according to some example embodiments may include a host 100 and a storage device 200.

The host 100 may be or include, e.g., a PC (personal computer), a laptop, a mobile phone, a smart phone, a tablet PC, and the like.

The host 100 may include a host controller 110 and host memory 120. The host memory 120 may function as a buffer memory for temporarily storing data to be transmitted to the storage device 200 or data transmitted from the storage device 200.

According to an example embodiment, the host controller 110 and the host memory 120 may be implemented as separate semiconductor chips. Alternatively, in an example embodiment, the host controller 110 and the host memory 120 may be integrated on the same semiconductor chip. As an example, the host controller 110 may be one of a plurality of modules provided in the application processor, and the application processor may be implemented as a system on chip (SoC). Further, the host memory 120 may be an embedded memory provided inside the application processor, or a non-volatile memory or a memory module placed outside the application processor.

The host controller 110 may manage an operation of storing the data (e.g., recorded data) of the host memory 120 in a non-volatile memory 220 of the storage device 200, or storing the data (e.g., read data) of the storage device's non-volatile memory 220 in the host memory 120.

The storage device 200 may be a storage medium for storing data in response to the request from the host 100. As an example, the storage device 200 may be an SSD (Solid State Drive), an embedded memory, a detachable external memory, etc. When the storage device 200 is an SSD, the storage device 200 may be a device that complies with the NVMe (non-volatile memory express) standard. When the storage device 200 is the embedded memory or the external memory, the storage device 200 may be a device that complies with a UFS (universal flash storage) or an eMMC (embedded multi-media card) standard. The host 100 and the storage device 200 may each generate and transmit packets complying with the adopted standard protocol.

The storage device 200 may include a storage controller 210 and the non-volatile memory (NVM) 220.

When the non-volatile memory 220 of the storage device 200 includes a flash memory, the flash memory may include a 2D NAND memory array or a 3D (or vertical) NAND (VNAND) memory array. As another example, the storage device 200 may include various other types of non-volatile memories. For example, a MRAM (Magnetic RAM), a spin-transfer torque MRAM, a conductive bridging RAM (CBRAM), a FeRAM (Ferroelectric RAM), a PRAM (Phase RAM), a resistor memory (Resistive RAM), and various other types of memories may be applied to the storage device 200.

The storage controller 210 may include a command distribution module 211, a plurality of cores 212, a flash translation layer (FTL) 214, a packet manager 215, a buffer memory 216, an ECC (Error Correction Code) engine 217, an AES (Advanced Encryption Standard) engine 218, a host interface 219_1, and a memory interface 219_2. The command distribution module 211, the plurality of cores 212, the flash translation layer 214, the packet manager 215, the buffer memory 216, the ECC engine 217, and the AES engine 218 may be electrically connected to each other through a bus 205.

The storage controller 210 may further include a working memory (not shown) to which the flash translation layer 214 is loaded, and writing and reading operations of data on the non-volatile memory may be controlled by executing the flash translation layer by the plurality of cores 212.

The host interface 219_1 may transmit and receive packets to and from the host 100. Packets transmitted from the host 100 to the host interface 219_1 may include commands or data to be recorded in the non-volatile memory 220, and the like, and the packets to be transmitted from the host interface 219_1 to the host 100 may include a response to the command, data read from the non-volatile memory 220, and the like. The memory interface 219_2 may transmit the data to be recorded in the non-volatile memory 220 to the non-volatile memory 220, or receive data read from the non-volatile memory 220. The memory interface 219_2 may be implemented to observe standard protocols such as Toggle or ONFI.

The state of the command distribution module 211 may be set, depending on the set commands provided from the host 100. The command distribution module 211 may distribute commands to the plurality of cores 212 depending on the set state. The command distribution module 211 may distribute, e.g., ADMIN commands and/or I/O commands provided from the host 100 to the plurality of cores 212. This will be explained below in detail referring to FIGS. 2 to 6.

The plurality of cores 212 may perform the operations instructed by commands distributed from the command distribution module 211. For example, the plurality of cores 212 may perform write operations according to the write commands distributed from the command distribution module 211, and may perform read operations according to the read commands distributed from the command distribution module 211.

Each of the plurality of cores 212 may be or include a central processing unit (CPU), a controller, an application specific integrated circuit (ASIC), and the like. The plurality of cores 212 may be homogeneous multi-core or heterogeneous multi-core.

The flash translation layer 214 may perform various functions such as address mapping, wear-leveling, and garbage collection. The address mapping operation is an operation of changing a logical address received from a host into a physical address that is used to actually store data in the non-volatile memory 220. The wear-leveling is a technique for ensuring that blocks in the non-volatile memory 220 are used uniformly to prevent excessive degradation of a particular block, and may be implemented, e.g., through a firmware technique that balances the erasure counts of the physical blocks. The garbage collection is a technique for securing the available capacity in the non-volatile memory 220 through a method of copying the valid data of the block to a new block and then erasing the existing block.

The packet manager 215 may generate a packet according to the protocol of the interface discussed with the host 100, or may parse various types of information from the packet received from the host 100. Also, the buffer memory 216 may temporarily store data to be recorded in the non-volatile memory 220, or data read from the non-volatile memory 220. The buffer memory 216 may be provided inside the storage controller 210, or it may be provided outside the storage controller 210.

The ECC engine 217 may perform error detection and correction functions on the data that is read from the non-volatile memory 220. For example, the ECC engine 217 may generate parity bits for the data to be written to the non-volatile memory 220, and the parity bits generated in this way may be stored in the non-volatile memory 220 together with the write data. When reading the data from the non-volatile memory 220, the ECC engine 217 may correct an error of the data that is read, using the parity bits that are read from the non-volatile memory 220 together with the data that is read, and may output the error-corrected data.

The AES engine 218 may perform at least one of an encryption operation and a decryption operation on the data to be input to the storage controller 210, e.g., using a symmetric-key algorithm.

Figure 2:
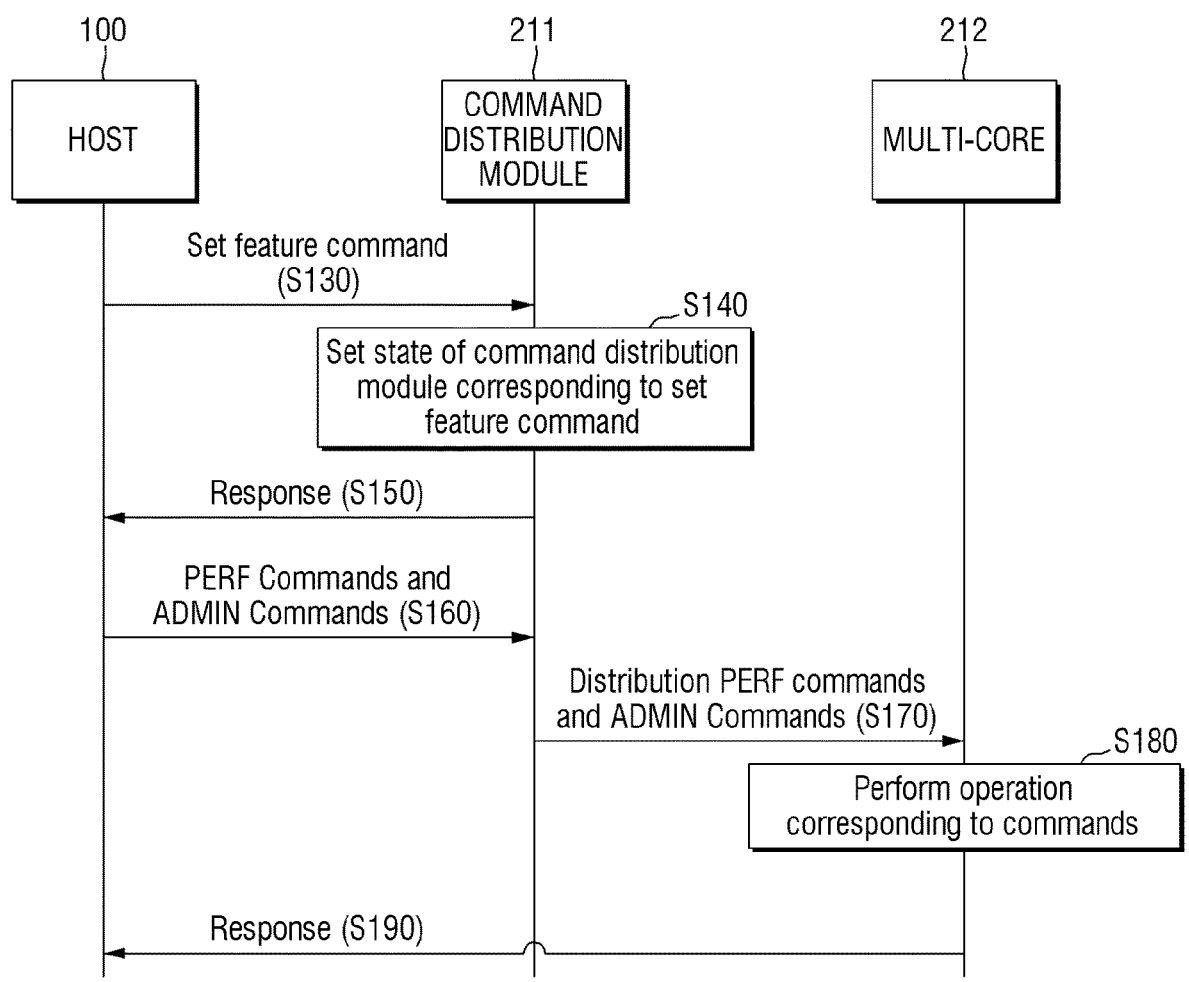
FIG. 2 is a diagram for explaining the operation of the storage system of FIG. 1.
Figure 3:
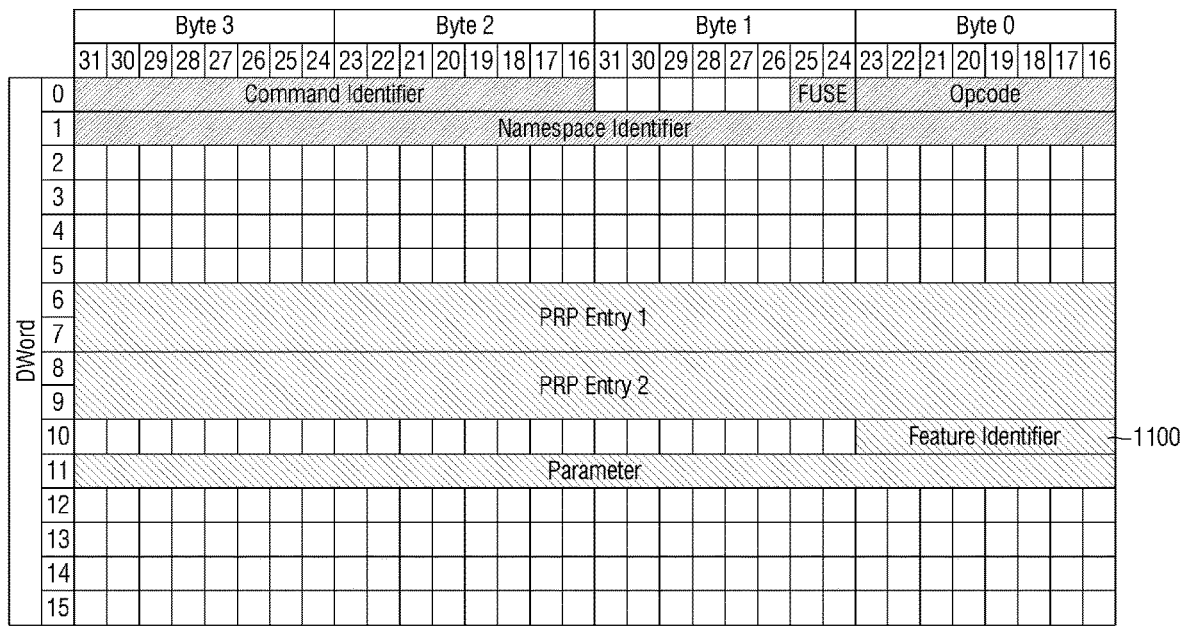
FIGS. 3 and 4 are diagrams for explaining a set command of FIG. 2.
Figure 4:
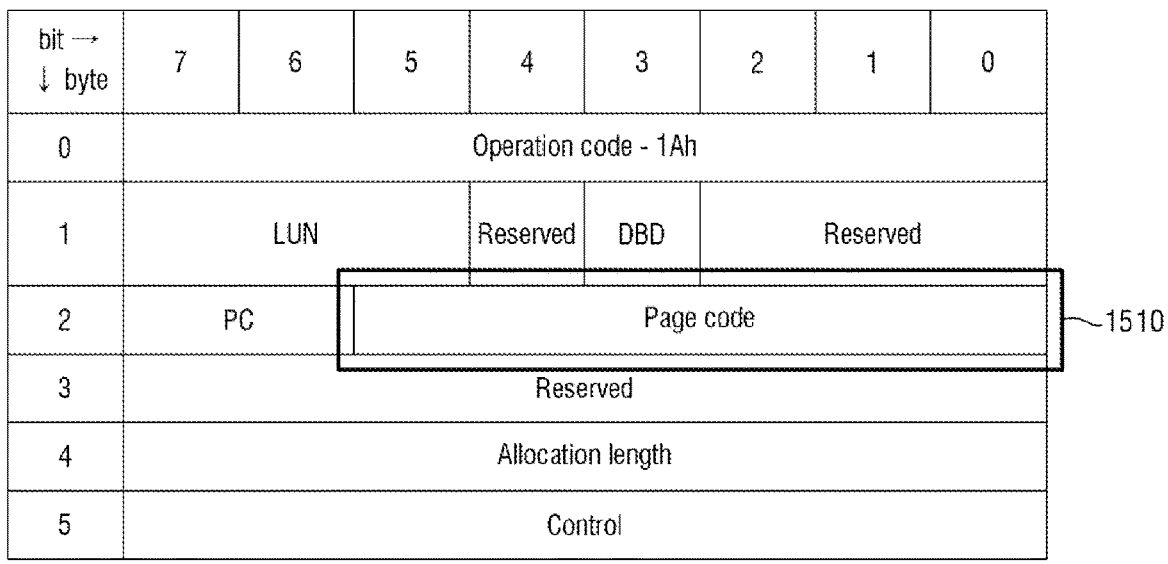

FIG. 2 is a diagram for explaining the operation of the storage system of FIG. 1. FIGS. 3 and 4 are diagrams for explaining the set command of FIG. 2.

Referring to FIG. 2, the host 100 may provide set commands to the command distribution module 211 (S130). The set command is a command for the host 100 to set the storage device 200, and may include information about the state of the command distribution module 211 (feature command).

For example, referring to FIG. 3, when the host interface (219_1 of FIG. 1) is an NVMe, the set command may be a set feature command 1000. The set feature command 1000 may include a region 1100 that includes a feature identifier. The feature identifier may mean the feature of the storage device 200 that the host 100 intends to set. The region 1100 including the feature identifier may include information about the state of the command distribution module 211.

In another example, referring to FIG. 4, when the host interface (219_1 of FIG. 1) is SAS (serial-attached SCSI), the set command may be a mode select command 1500. The mode select command 1500 may include a region 1510 including a page code. The page code may mean a code of the storage device 200 that the host 100 intends to select. The region 1510 including the page code may include information about the state of the command distribution module 211.

In still another example (not shown), when the host interface (219_1 of FIG. 1) is SATA, the set command may be a set feature command. A subcommand value of the set feature command may include information about the state of the command distribution module 211. The present disclosure is not limited thereto, and the set command may be any command including information about the state of the command distribution module 211.

Referring to FIG. 2 again, the state of the command distribution module 211 may be set depending on the set command (S140). The state may include, e.g., first to fourth states different from each other. The present disclosure is not limited thereto, and the definition of states and the number of states may be various, depending on the set command of the host 100. Hereinafter, a detailed description will be given referring to FIGS. 3 to 6.

The command distribution module 211 may issue a response to inform the host 100 that the state is set according to the set command (S150).

The host 100 may provide an I/O command (PERF command) and an ADMIN command to the command distribution module 211 (S160).

In an example embodiment, the I/O command (PERF command) means a command that instructs an operation in which data is input from the host 100 or data is output to the host 100. The I/O command (PERF command) may include, e.g., a write command and/or a read command.

In an example embodiment, the ADMIN command means a command for the host 100 to manage the storage device (200 of FIG. 1). The ADMIN command may include, e.g., a read command or a write command for metadata of firmware. The read command or the write command for metadata of firmware may be generated when an event such as sudden power off (SPO) occurs.

When the host interface (219_1 of FIG. 1) is an NVMe, the I/O command (PERF command) may be an NVM I/O command in the NVMe command, and the ADMIN command may be an ADMIN command in the NVMe command.

The command distribution module 211 may distribute the I/O command (PERF command) and the ADMIN command to a plurality of cores 212 depending on the set state (S170).

The plurality of cores 212 may perform the operations instructed by the distributed I/O command (PERF command) and the operation instructed by the distributed ADMIN command (S180).

The plurality of cores 212 may issue a response to notify the host 100 that the operation instructed by the distributed I/O command (PERF command), and the operation instructed by the distributed ADMIN command have been performed (S190).

In the storage system according to some example embodiments, the host 100 may provide set commands depending on the environment or the like of the storage system, and thus, the commands may not be evenly distributed to each core 212, but may be distributed to each core 212 depending on the set command. Therefore, the utilization of each core 212 may be further improved, and commands may be processed efficiently depending on the environments of various storage systems.

FIGS. 5 through 8 are diagrams for explaining the operation of the command distribution module of FIG. 1.

Figure 5:
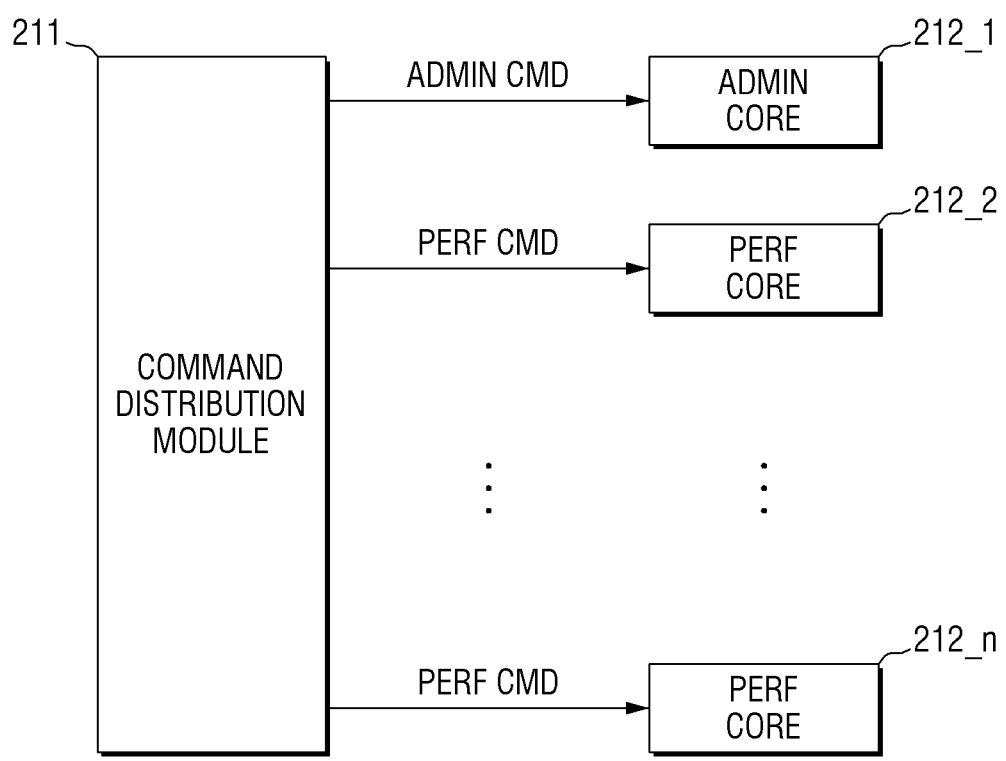
FIGS. 5 to 8 are diagrams for explaining the operation of a command distribution module of FIG. 1.

Referring to FIG. 5, the command distribution module 211 may be set to a first state 211_a. The first state 211_a may be, e.g., a normal state. Hereinafter, the first state 211_a will be explained as the normal state.

The normal state 211_a may be a basic state of the command distribution module 211. When the set command is not provided from the host 100, the command distribution module 211 may be in the normal state 211_a.

The command distribution module 211 of the normal state 211_a may distribute the ADMIN command (ADMIN CMD) to one core 212_1 (ADMIN core) of a plurality of cores 212, and may distribute the I/O command (PERF CMD) to the remaining cores 212_2 to 212_n (PERF cores). The present disclosure is not limited thereto, and the command distribution module 211 may distribute the ADMIN command (ADMIN CMD) to two or more cores among a plurality of cores 212.

The plurality of cores 212_1 to 212_n may be divided into the core 212_1 that performs the operation instructed by the ADMIN command (ADMIN CMD) for managing the storage device, and cores 212_2 to 212_n that perform the operation instructed by the I/O command (PERF CMD) provided from the host. Therefore, in the plurality of cores 212_2 to 212_n, even if the pattern of the I/O command (PERF CMD) provided from the host changes, since the cores 212_1 to 212_n to which the I/O command (PERF CMD) provided from the host is distributed are defined, the operation instructed by the I/O command (PERF CMD) may be executed more stably.

Figure 6:
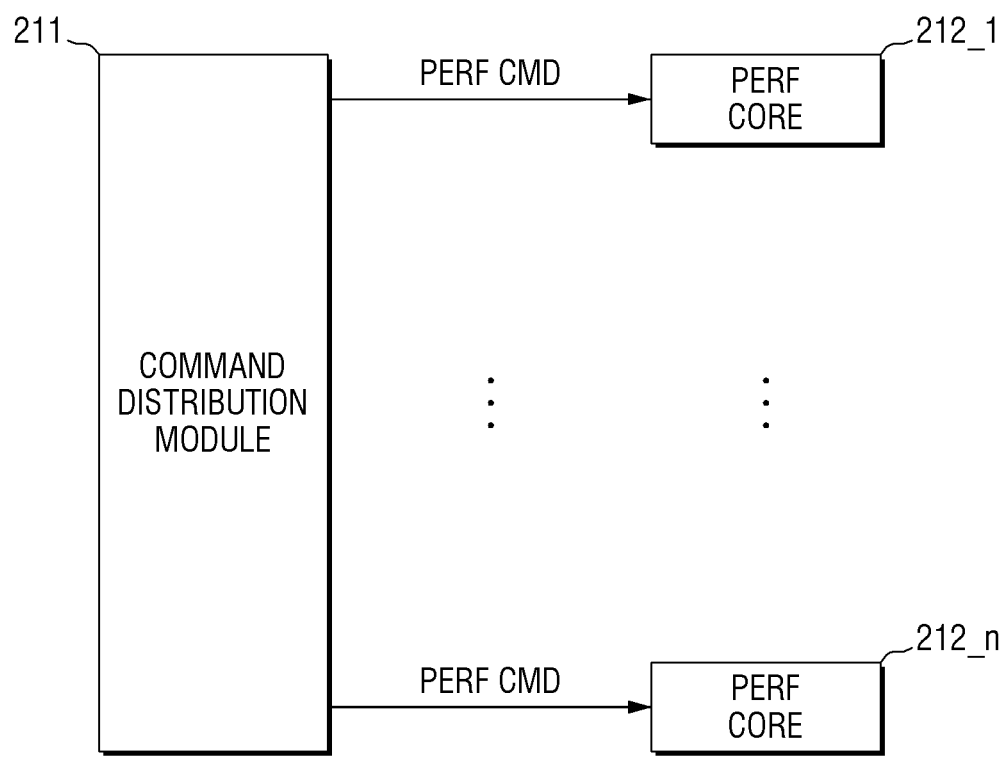

Referring to FIG. 6, the command distribution module 211 may be set to a second state 211_b. The second state 211_b may be, e.g., a maximum operating state. Hereinafter, the second state 211_b will be explained as the maximum operating state.

For example, a bottleneck phenomenon may occur in the storage device due to an overhead of firmware. In this case, the host may provide the set command including the maximum operating state 211_b to the command distribution module 211.

The command distribution module 211 of the maximum operating state 211_b may distribute the command (PERF CMD), provided from the host, to the entire plurality of cores 212_1 to 212_n, and may not distribute the ADMIN command. Thus, the I/O command (PERF CMD) may be distributed to all the plurality of cores 212_1 to 212_n. Accordingly, the plurality of cores 212_1 through 212_n may perform only the operations instructed by the I/O command (PERF CMD) provided from the host. Therefore, the performance of the storage device may be further improved.

However, the set command that sets the state of the command distribution module 211 provided from the host may be processed. Thus, the command distribution module 211 may receive the set command, and may be set to another state.

Figure 7:
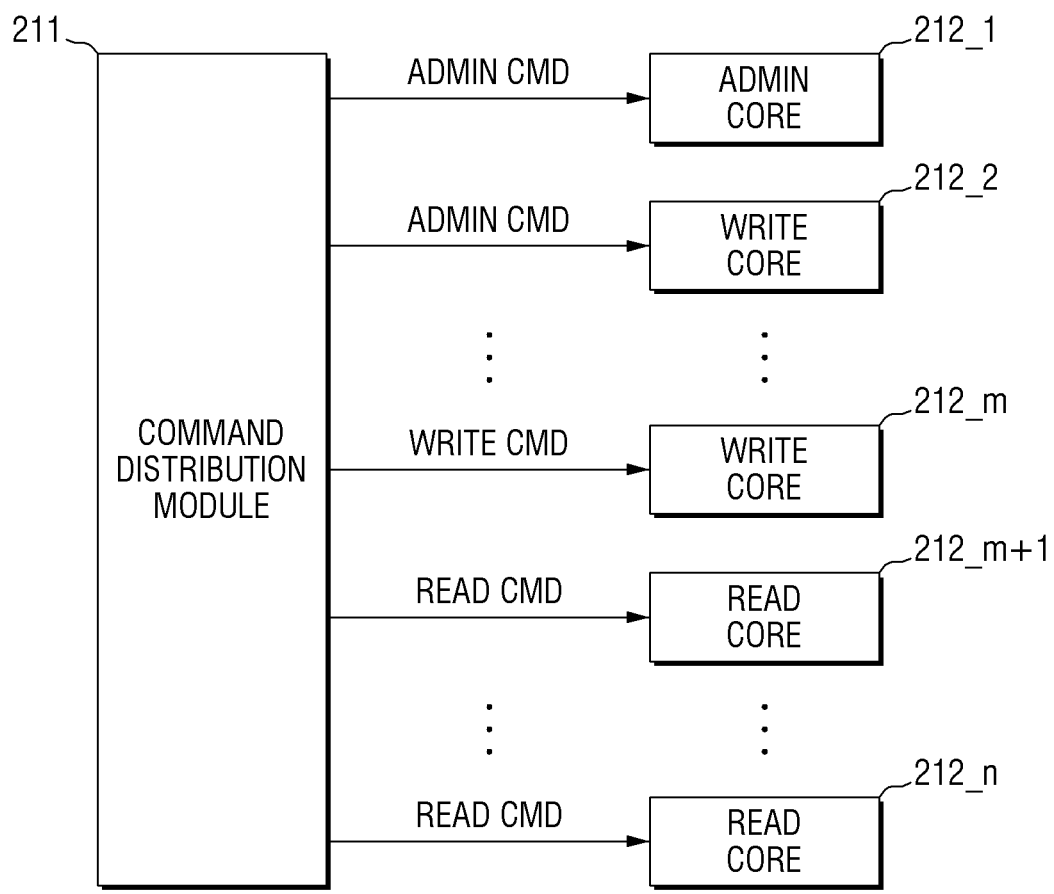

Referring to FIG. 7, the command distribution module 211 may be in a third state 211_c. The third state 211_c may be, e.g., a low latency state. Hereinafter, the third state 211_c will be explained as the low-latency state.

For example, the latency may occur in the write operation or read operation of the non-volatile memory (220 of FIG. 1). When the write command (WRITE CMD) and the read command (READ CMD) are distributed to one core, latency may occur in the execution of operation instructed by the read command (READ CMD) due to execution of the operation instructed by the write command (WRITE CMD), or latency may occur in the execution of the operation instructed by the write command (WRITE CMD) due to execution of the operation instructed by the read command (READ CMD). In this case, the host may provide the command distribution module 211 with set commands that include the low latency state 211_c.

The command distribution module 211 of the low latency state 211_c may distribute the ADMIN command (ADMIN CMD) to one core 212_1 of a plurality of cores 212_1 to 212_n, may distribute the write command (WRITE CMD) to some other cores 212_2 to 212_m, and may distribute the read command (READ CMD) to the remaining cores 212_m+1 to 212_n. The present disclosure is not limited thereto, and the command distribution module 211 may distribute the ADMIN command (ADMIN CMD) to two or more cores among a plurality of cores 212_1 to 212_n.

Accordingly, the plurality of cores 212_1 to 212_n may be divided into a core 212_1 that performs the operation instructed by the ADMIN command (ADMIN CMD) for managing the storage device, cores 212_2 to 212_m that perform the operation instructed by the write command (WRITE CMD) provided from the host, and cores 212_m+1 to 212_n that perform the operation instructed by the read command (READ CMD) provided from the host. Therefore, the latency may be reduced when performing the operation instructed by the read command (READ CMD) or the write command (WRITE CMD).

Figure 8:
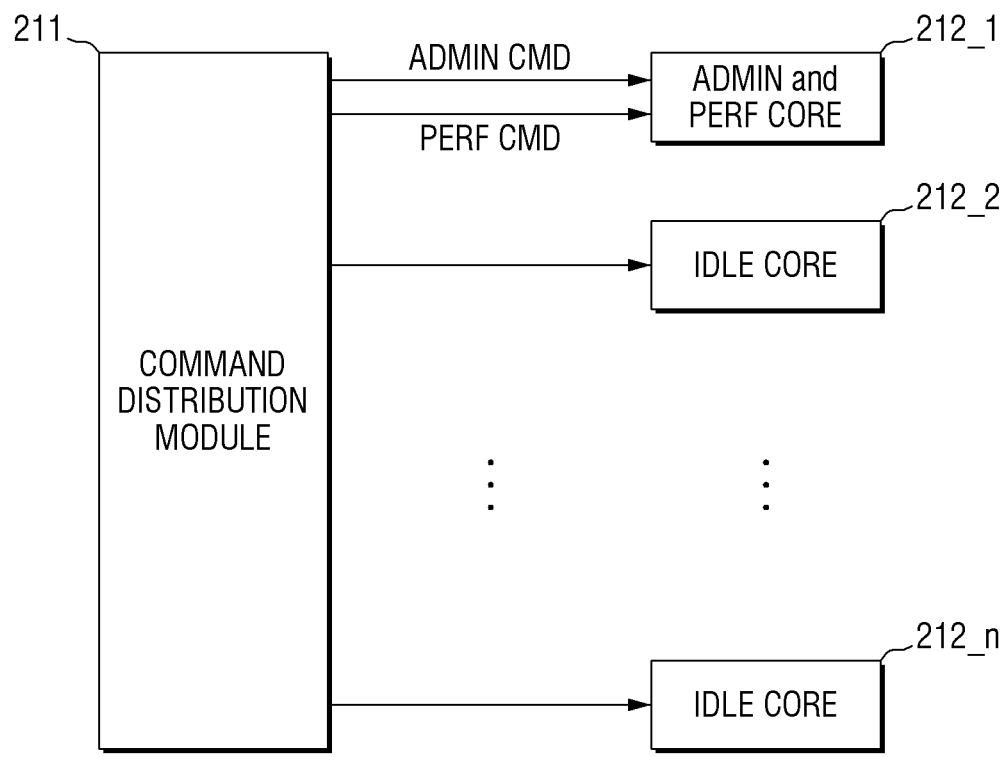

Referring to FIG. 8, the command distribution module 211 may be set to a fourth state 211_d. The fourth state 211_d may be, e.g., a low power state. Hereinafter, the fourth state 211_d will be explained as the low power state.

For example, a storage device may be in an idle state. In this case, the host may provide the set command including the low power state 211_d to the command distribution module 211.

The command distribution module 211 of the low power state 211_d may distribute the ADMIN command (ADMIN CMD) and I/O command (PERF CMD) to one core 212_1 of the plurality of cores 212_1 to 212_n. The present disclosure is not limited thereto, and the command distribution module 211 may distribute the ADMIN command (ADMIN CMD) and I/O command (PERF CMD) to only some cores of the plurality of cores 212_1 to 212_n.

Accordingly, only, e.g., core 212_1 of the plurality of cores 212_1 to 212_n may perform the operations instructed by the ADMIN command (ADMIN CMD) and the I/O command (PERF CMD), while remaining cores may be idle. Therefore, the power consumption of the storage device may be reduced.

The definition of states and the number of states are not limited to those shown in FIGS. 6 to 9, and may vary. The host 100 may provide the command distribution module 211 with set command that includes different states other than the states shown in FIGS. 6 to 9, depending on the needs of the host 100 and/or the state of the storage device. For example, the host 100 may provide the command distribution module 211 with the set command including the state in which the I/O commands provided from the host 100 are not distributed to at least one of the plurality of cores 212_1 to 212_n, but the garbage collection commands are distributed into the storage device.

Figure 9:
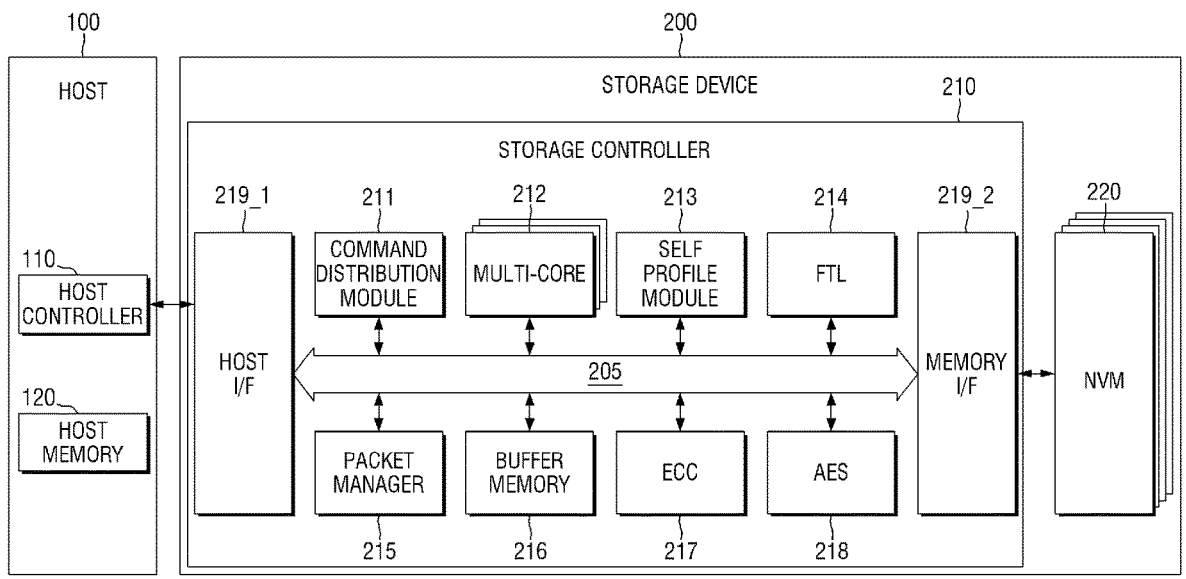
FIG. 9 is a block diagram for explaining a storage system according to some other example embodiments.
Figure 10:
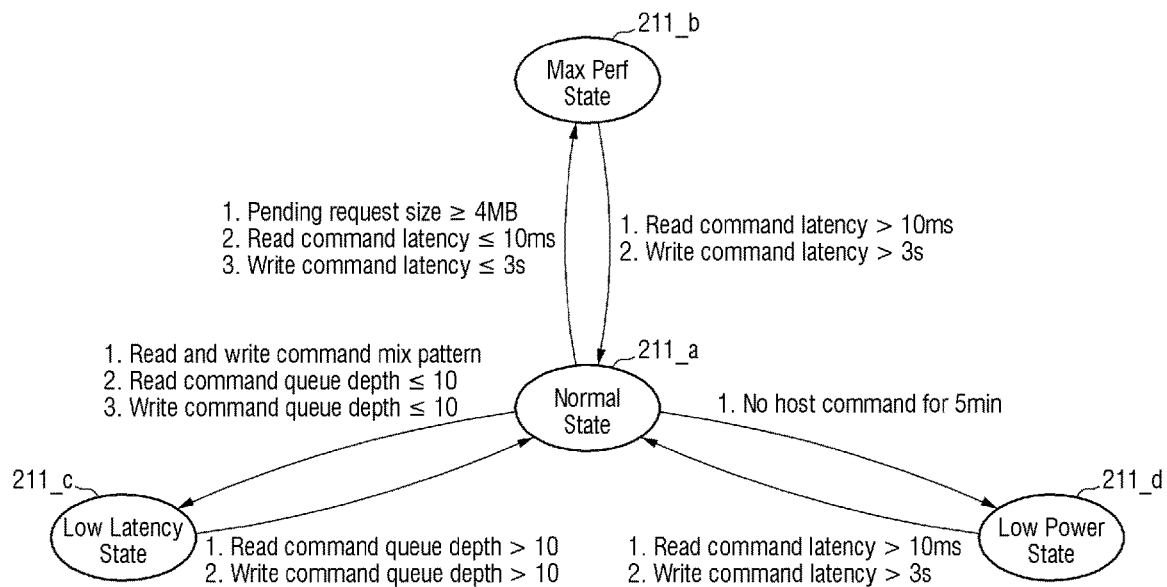
FIGS. 10 and 11 are diagrams for explaining the operation of the storage system of FIG. 9.
Figure 11:
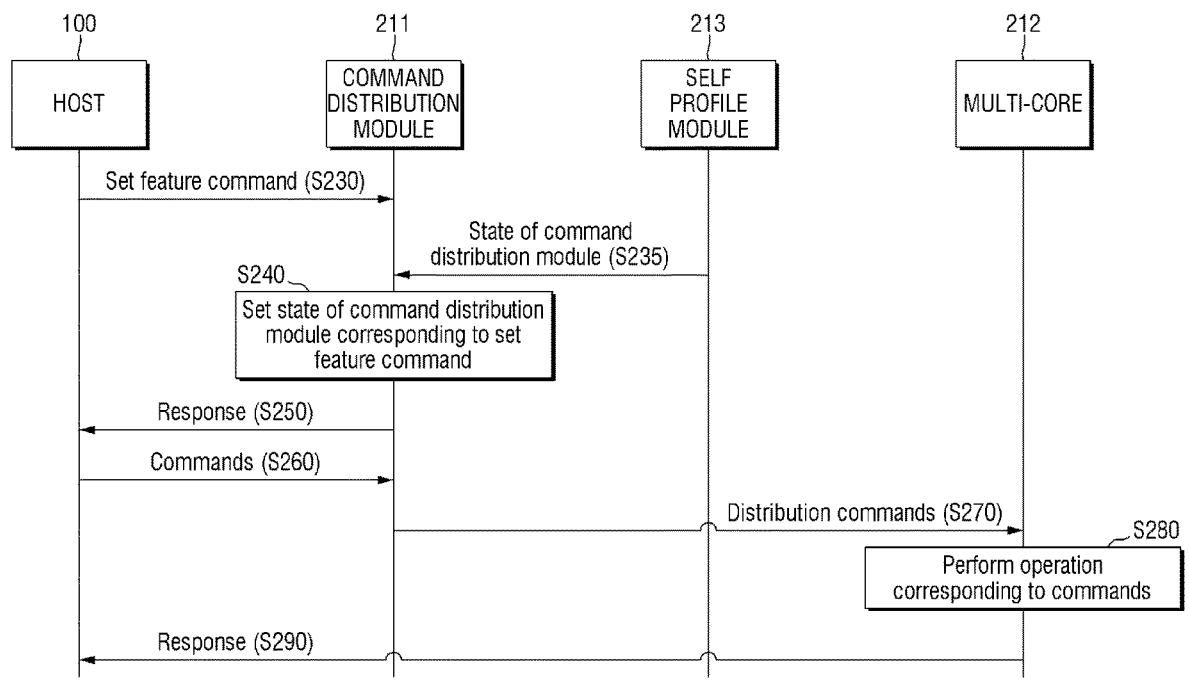

FIG. 9 is a block diagram for explaining a storage system according to some other example embodiments. FIGS. 10 and 11 are diagrams for explaining the operation of the storage system of FIG. 9. Points different from those described referring to FIGS. 1 to 8 will be mainly explained.

Referring to FIG. 9, a storage system 2 according to some other example embodiments may further include a self profile module 213. The command distribution module 211, the plurality of cores 212, the self profile module 213, the flash translation layer 214, the packet manager 215, the buffer memory 216, the ECC engine 217, and the AES engine 218 may be electrically connected to each other through a bus 205.

The self profile module 213 may monitor the plurality of cores 212. The self profile module 213 may monitor, e.g., the type of I/O command provided from the host 100, the latency of the I/O command, the magnitude of the pending request in the plurality of cores 212, a queue depth of the plurality of cores 212, or an interval at which I/O commands are provided from the host 100. The queue depth may be the number of pending commands in the plurality of cores 212. Here, the dimension of the request may be a product of the dimension of the pending command in the plurality of cores 212 and the queue depth of the commands (the number of commands).

The self profile module 213 may monitor the plurality of cores 212 to generate the set commands. The command distribution module 211 may receive the set command from the self profile module 213, and may be set to the state depending on the set command. Hereinafter, a detailed description will be given referring to FIGS. 10 and 11.

The self profile module 213 may be implemented as, e.g., software such as applications and firmware executed on the storage device 200.

Referring to FIGS. 9 and 10, the self profile module 213 may generate the set commands according to predetermined conditions. An initial state of the command distribution module 211 may be in the normal state 211_a.

In an example embodiment, when the monitoring result shows that the dimension of the pending request in a plurality of cores 212 is 4 MB or more, the latency of the read command is 10 ms or less, and the latency of the write command is 3 s or less, the self profile module 213 may set the set command including the maximum operating state 211_b. As a result, the command distribution module 211 may be set to the maximum operating state 211_b, and the commands may be distributed to the plurality of cores 212 according to the maximum operating state 211_b.

The self profile module 213 may generate the set command including the low power state 211_d, e.g., when no I/O command is provided from the host 100 to the storage device 200 during a preset time as the monitoring result. Accordingly, the command distribution module 211 may be set to the low power state 211_d, and distribute the commands to the plurality of cores 212 according to the low power state 211_d. Although the preset time may be, e.g., 5 minutes, the present disclosure is not limited thereto.

The self profile module 213 may generate the set command including the normal state 211_a, e.g., when the latency of the read command exceeds 10 ms and the latency of the write command exceeds 3 s. As a result, the command distribution module 211 may be set to the normal state 211_a, and may distribute the commands to the plurality of cores 212 according to the normal state 211_a.

In an example embodiment, when the monitoring result shows that the write command and the read command are provided from the host 100 to the storage device 200 in a mixed pattern, the queue depth of the read command is 10 or less, and the queue depth of the write command is 10 or less, the self profile module 213 may generate the set command including the low latency state 211_c. Accordingly, the command distribution module 211 may be set to the low latency state 211_c and may distribute commands to a plurality of cores 212 according to the low latency state 211_c.

In an example embodiment, when the monitoring result shows that the queue depth of the read command exceeds 10 and the queue depth of the write command exceeds 10, the self profile module 213 may generate the set command including the normal state 211_a. Accordingly, the command distribution module 211 may be set to the normal state 211_a, and may distribute the commands to the plurality of cores 212 according to the normal state 211_a.

The definition of the states 211_a, 211_b, 211_c, and 211_d, the number of states 211_a, 211_b, 211_c, and 211_d, and conditions set for each of the states 211_a, 211_b, 211_c, and 211_d are not limited to those shown in FIG. 10, but may be varied. The definition of the states 211_a, 211_b, 211_c, and 211_d, the number of states 211_a, 211_b, 211_c, and 211_d, and conditions set for each of the states 211_a, 211_b, 211_c, and 211_d may be preset at the time of manufacturing the storage controller by a manufacturer, and/or may be preset by a user.

Referring to FIG. 11, the command distribution module 211 may receive the set command from the host 100 (S230), and may receive the state from the self profile module 213 (S235). The command distribution module 211 may receive the set command from the host 100 and the state from the self profile module 213 at the same time. In this case, the state of the command distribution module 211 may be set, depending on the set command provided from the host 100 (S240). Thus, the set command provided from the host 100 may take precedence over the state provided from the self profile module 213. However, the present disclosure is not limited thereto, and the state provided from the self profile module 213 may take precedence over the set command provided from the host 100, depending on the setting.

Subsequently, as described above in FIG. 2, the command distribution module 211 may issue a response to notify the host 100 that the state has been set according to the set command (S250), and the host 100 may provide I/O commands and ADMIN commands to the command distribution module 211 (S260). The command distribution module 211 may distribute the I/O commands and the ADMIN commands to a plurality of cores depending on the set state (S270). Each core may perform the operations instructed by the distributed commands (S280), and the plurality of cores may issue a response to inform the host 100 that the operations instructed by multi I/O commands have been performed (S290).

Figure 12:
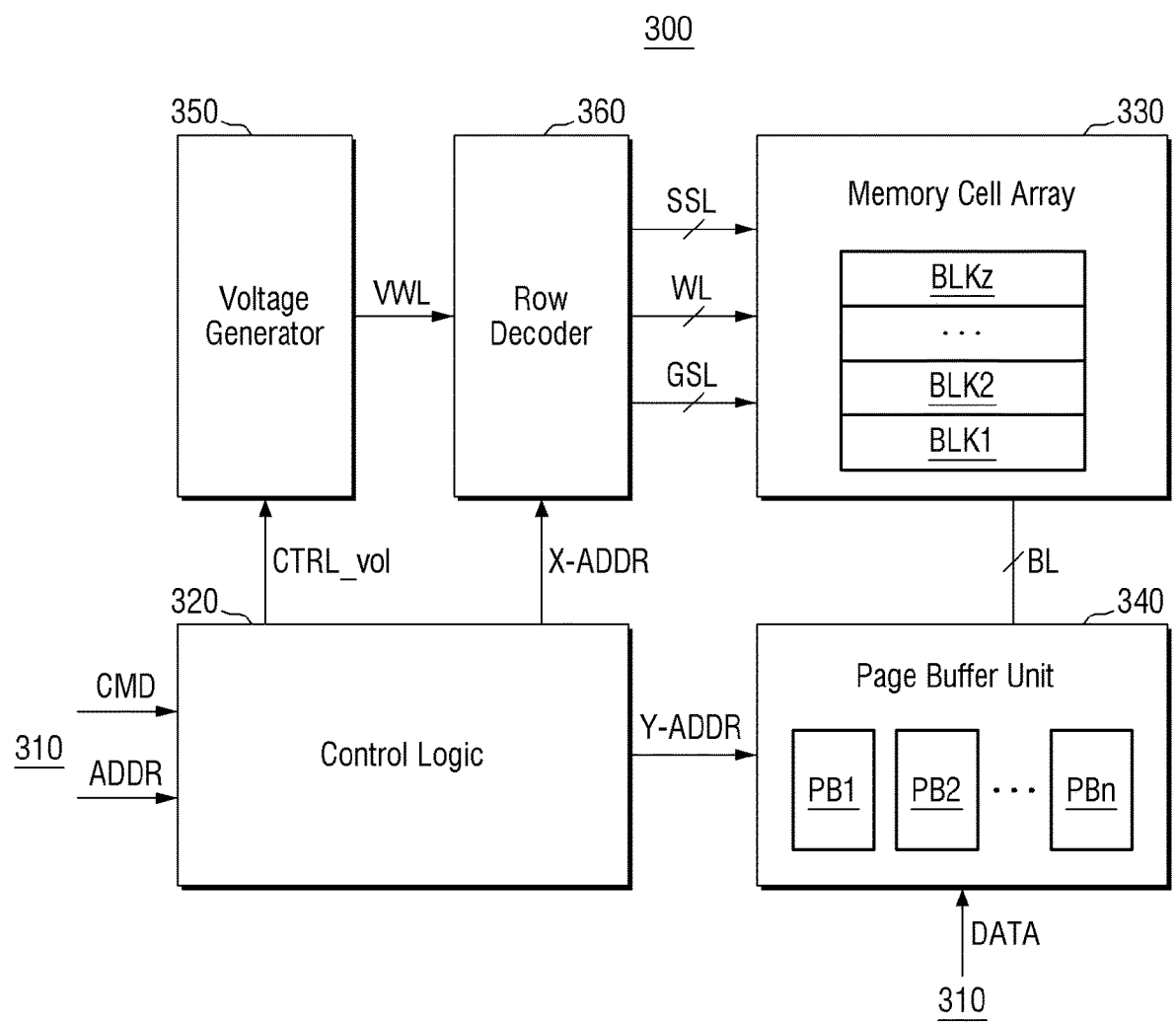
FIG. 12 is a block diagram for explaining the non-volatile memory of FIG. 1.

FIG. 12 is a block diagram for explaining the non-volatile memory of FIG. 1.

Referring to FIG. 12, a non-volatile memory 300 may include a control logic circuit 320, a memory cell array 330, a page buffer unit 340, a voltage generator 350, and a row decoder 360. Although not shown in detail in FIG. 10, the non-volatile memory 300 may further include a memory interface circuit 310, and may further include a column logic, a pre-decoder, a temperature sensor, a command decoder, an address decoder, and the like.

The control logic circuit 320 may generally control various operations inside the non-volatile memory 300. The control logic circuit 320 may output various control signals in response to the command CMD and/or the address ADDR from the memory interface circuit 310. For example, the control logic circuit 320 may output a voltage control signal CTRL vol, a row address X-ADDR, and a column address Y-ADDR.

The memory cell array 330 may include a plurality of memory blocks BLK1 to BLKz (z is a positive integer), and each of the plurality of memory blocks BLK1 to BLKz may include a plurality of memory cells. The memory cell array 330 may be connected to the page buffer unit 340 through bit lines BL, and may be connected to the row decoder 360 through word lines WL, string select lines SSL, and ground select lines GSL.

In an example embodiment, the memory cell array 330 may include a three-dimensional memory cell array, and the three-dimensional memory cell array may include the plurality of NAND strings. Each NAND string may include memory cells each connected to word lines vertically stacked on the substrate. U.S. Pat. Nos. 7,679,133, 8,553,466, 8,654,587, 8,559,235, and U.S. Patent Application Publication No. 2011/0233648 are incorporated herein by reference. In an example embodiment, the memory cell array 330 may include a 2D memory cell array, and the 2D memory cell array may include a plurality of NAND strings placed along row and column directions.

The page buffer unit 340 may include a plurality of page buffers PB1 to PBn (n is an integer of 3 or more), and the plurality of page buffers PB1 to PBn may be connected to each of the memory cells through the plurality of bit lines BL. The page buffer unit 340 may select at least one bit line among the bit lines BL in response to the column address Y-ADDR. The page buffer unit 340 may operate as a write driver or a detection amplifier, depending on the operation mode. For example, at the time of the program operation, the page buffer unit 340 may apply a bit line voltage corresponding to the data to be programmed to the selected bit line. At the time of the read operation, the page buffer unit 340 may detect the current or voltage of the selected bit line to detect the data stored in the memory cell.

The voltage generator 350 may generate various types of voltages for executing program, read, and erasure operations on the basis of the voltage control signal CTRL vol. For example, the voltage generator 350 may generate a program voltage, a read voltage, a program verification voltage, an erasure voltage, and the like, as a word line voltage VWL.

The row decoder 360 may select one of the plurality of word lines WL in response to the row address X-ADDR, and select one of the plurality of string select lines SSL. For example, at the time of the program operation, the row decoder 360 may apply the program voltage and the program verification voltage to the selected word line, and at the time of the read operation, the row decoder 360 may apply the read voltage to the selected word line.

Figure 13:
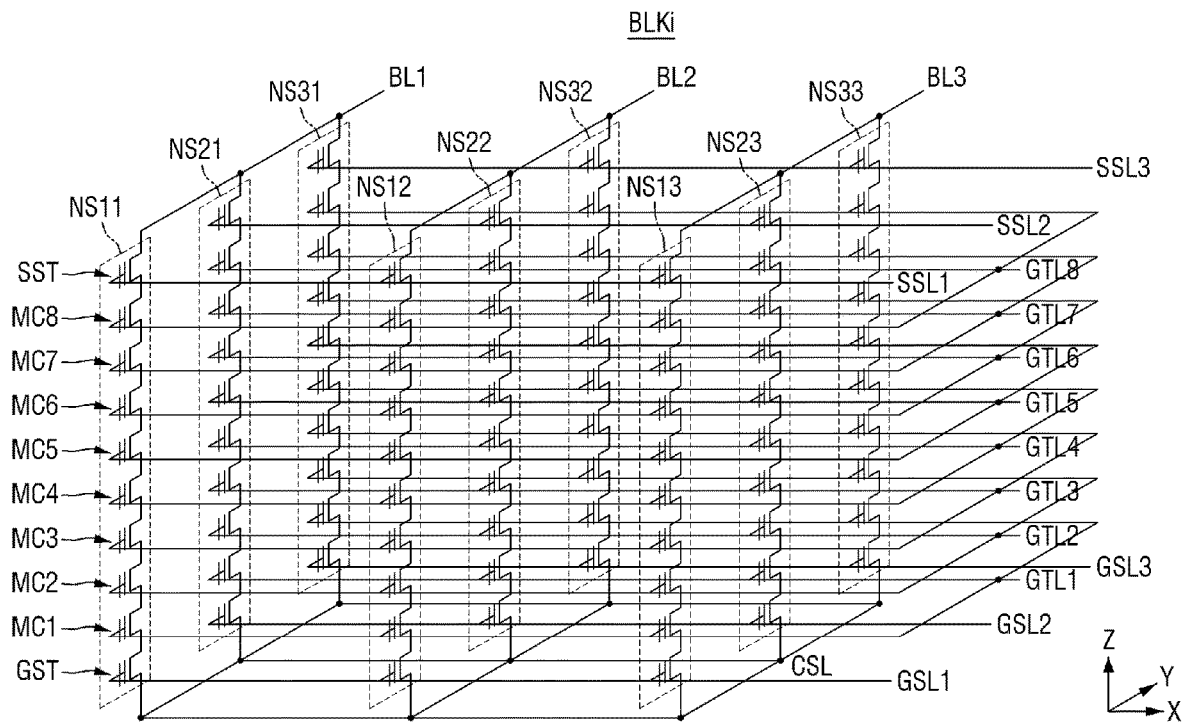
FIG. 13 is a diagram for explaining a 3D V-NAND structure that may be applied to the non-volatile memory of FIG. 1.

FIG. 13 is a diagram for explaining a 3D V-NAND structure that may be applied to the non-volatile memory of FIG. 1. When the non-volatile memory of FIG. 1 is implemented as a 3D V-NAND type flash memory, each of the plurality of memory blocks BLK1 to BLKz constituting the memory cell array 330 of the non-volatile memory may be represented by an equivalent circuit as shown in FIG. 13.

Referring to FIG. 13, a memory block BLKi may be a three-dimensional memory block formed on a substrate in a three-dimensional structure. For example, a plurality of memory NAND strings included in the memory block BLKi may be formed in a direction perpendicular to the substrate.

The memory block BLKi may include a plurality of memory NAND strings NS11, NS12, NS13, NS21, NS22, NS23, NS31, NS32, and NS33 connected between the bit lines BL1, BL2, and BL3 and a common source line CSL. The memory NAND strings NS11 to NS33 may each include a string select transistor SST, a plurality of memory cells MC1, MC2, . . . , and MC8, and a ground select transistor GST. Although FIG. 11 shows that the plurality of memory NAND strings NS11 to NS33 each include eight memory cells MC1, MC2, . . . , and MC8, example embodiments are not limited thereto.

The string select transistor SST may be connected to the corresponding string select lines SSL1, SSL2, and SSL3. The plurality of memory cells MC1, MC2, . . . , and MC8 may be connected to the corresponding gate lines GTL1, GTL2, . . . , and GTL8. The gate lines GTL1, GTL2, . . . , and GTL8 may correspond to word lines, and some of the gate lines GTL1, GTL2, . . . , and GTL8 may correspond to dummy word lines. The ground select transistor GST may be connected to the corresponding ground select lines GSL1, GSL2, and GSL3. The string select transistor SST may be connected to the corresponding bit lines BL1, BL2, and BL3, and the ground select transistor GST may be connected to the common source line CSL.

The word lines (e.g., WL1) of the same height may be connected in common, and the ground select lines GSL1, GSL2, and GSL3 and the string select lines SSL1, SSL2, and SSL3 may be separated from each other. Although FIG. 11 shows that the memory block BLK is connected to eight gate lines GTL1, GTL2, . . . , and GTL8 and three bit lines BL1, BL2, and BL3, example embodiments are not limited thereto.

Figure 14:
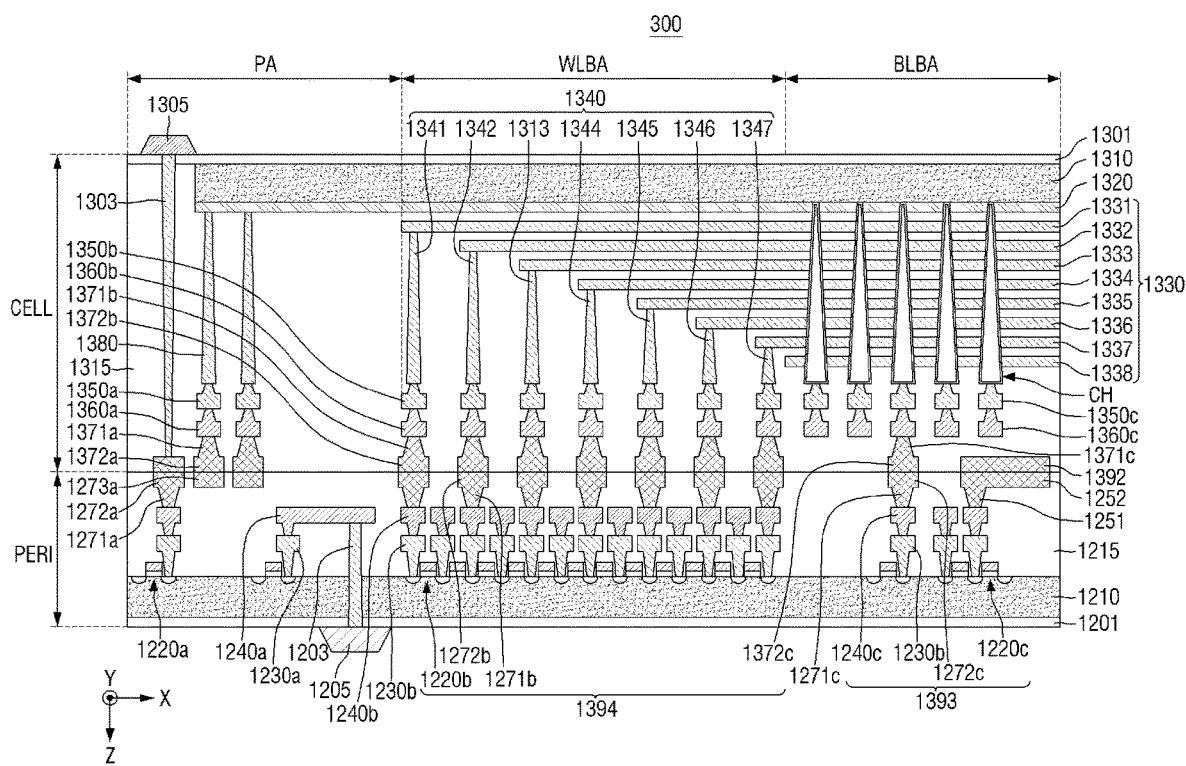
FIG. 14 is a diagram for explaining a BVNAND structure that may be applied to the non-volatile memory of FIG. 1.

FIG. 14 is a diagram for explaining a BVNAND structure that may be applied to the non-volatile memory of FIG. 1.

Referring to FIG. 14, a non-volatile memory 300 may have a C2C (chip to chip) structure. The C2C structure may mean a structure in which an upper chip including a cell region CELL is manufactured on a first wafer, a lower chip including a peripheral circuit region PERI is manufactured on a second wafer different from the first wafer, and after that, the upper chip and the lower chip are bonded to each other by a bonding operation. As an example, the bonding operation may mean an operation of electrically connecting a bonding metal formed on an uppermost metal layer of the upper chip and a bonding metal formed on an uppermost metal layer of the lower chip. For example, when the bonding metal is formed of copper (Cu), the bonding operation may be a Cu—Cu bonding way. The bonding metal may be formed of aluminum or tungsten.

Each of the peripheral circuit region PERI and the cell region CELL of the non-volatile memory 300 according to some example embodiments may include an external pad bonding region PA, a word line bonding region WLBA, and a bit line bonding region BLBA.

The peripheral circuit region PERI may include a first substrate 1210, an interlayer insulation layer 1215, a plurality of circuit elements 1220a, 1220b, and 1220c formed on the first substrate 1210, first metal layers 1230a, 1230b, and 1230c connected to each of the plurality of circuit elements 1220a, 1220b, and 1220c, and second metal layers 1240a, 1240b, and 1240c formed on the first metal layers 1230a, 1230b, and 1230c. In an example embodiment, the first metal layers 1230a, 1230b, and 1230c may be formed of tungsten which has a relatively high resistance, and the second metal layers 1240a, 1240b, and 1240c may be formed of copper which has a relatively low resistance.

In the present specification, although only the first metal layers 1230a, 1230b, and 1230c and the second metal layers 1240a, 1240b, and 1240c are shown and explained, the example embodiments are not limited thereto, and at least one or more metal layers may be further formed on the second metal layers 1240a, 1240b, and 1240c. At least a part of one or more metal layers formed above the second metal layers 1240a, 1240b, and 1240c may be formed of aluminum or the like having a lower resistance than copper that forms the second metal layers 1240a, 1240b, and 1240c.

An interlayer insulation layer 1215 may be formed on the first substrate 1210 to cover a plurality of circuit elements 1220a, 1220b and 1220c, the first metal layers 1230a, 1230b, and 1230c, and the second metal layers 1240a, 1240b, and 1240c, and may include insulating materials such as silicon oxides and silicon nitrides.

Lower bonding metals 1271b and 1272b may be formed on the second metal layer 240b of the word line bonding region WLBA. In the word line bonding region WLBA, the lower bonding metals 1271b and 1272b of the peripheral circuit region PERI may be electrically connected to the upper bonding metals 1371b and 1372b of the cell region CELL by the bonding way. The lower bonding metals 1271b and 1272b and the upper bonding metals 1371b and 1372b may be formed of aluminum, copper, tungsten, or the like.

The cell region CELL may provide at least one memory block. The cell region CELL may include a second substrate 1310, and a common source line 1320 (corresponding to CSL of FIG. 10). A plurality of word lines (1331 to 1338; collectively, 1330 corresponding to WL1 to WL8 of FIG. 10) may be stacked on the second substrate 1310 along a third direction z perpendicular to the upper face of the second substrate 1310. The string select lines and the ground select line may be placed above and below the word lines 1330, and the word lines 1330 may be placed between the string select lines and the ground select line.

In the bit line bonding region BLBA, the channel structure CH may extend in a direction perpendicular to the upper face of the second substrate 1310, and may penetrate the word lines 1330, the string select lines, and the ground select line. The channel structure CH may include a data storage layer, a channel layer, a buried insulating layer, and the like, and the channel layer may be electrically connected to the first metal layer 1350c and the second metal layer 1360c. For example, the first metal layer 1350c may be a bit line contact, and the second metal layer 1360c may be a bit line (corresponding to BL1 to BL3 of FIG. 10). In an example embodiment, the bit line 1360c may extend along a second direction y parallel to the upper face of the second substrate 1310.

In the example embodiment shown in FIG. 14, a region in which the channel structure CH, the bit line 1360c, and the like are placed may be defined as a bit line bonding region BLBA. The bit line 1360c may be electrically connected to the circuit elements 1220c (which may provide a page buffer 1393) in the peripheral circuit region PERI in the bit line bonding region BLBA. As an example, the bit line 1360c may be connected to the upper bonding metals 1371c and 1372c in the peripheral circuit region PERI, and the upper bonding metals 1371c and 1372c may be connected to the lower bonding metals 1271c and 1272c connected to the circuit elements 1220c of the page buffer 1393.

In the word line bonding region WLBA, the word lines 1330 may extend along the first direction x parallel to the upper face of the second substrate 1310, and may be connected to the plurality of cell contact plugs (1341 to 1347; collectively, 1340). The word lines 1330 and the cell contact plugs 1340 may be connected at pads provided by extending at least a part of the word lines 1330 along the first direction x at different lengths from each other. The first metal layer 1350b and the second metal layer 1360b may be connected sequentially to the upper part of the cell contact plugs 1340 connected to the word lines 1330. The cell contact plugs 1340 may be connected to the peripheral circuit region PERI through the upper bonding metals 1371b and 1372b of the cell region CELL and the lower bonding metals 1271b and 1272b of the peripheral circuit region PERI in the word line bonding region WLBA.

The cell contact plugs 1340 may be electrically connected to the circuit elements 1220b (which may provide a row decoder 1394) in the peripheral circuit region PERI. In an example embodiment, the operating voltage of the circuit elements 1220b that provide the row decoder 1394 may differ from the operating voltage of the circuit elements 1220c that provide the page buffer 1393. As an example, the operating voltage of the circuit elements 1220c that provide the page buffer 1393 may be higher than the operating voltage of the circuit elements 1220b that provide the row decoder 1394.

A common source line contact plug 1380 may be formed in the external pad bonding region PA. The common source line contact plug 1380 may be formed of a conductive material such as a metal, a metal compound, or polysilicon, and may be electrically connected to the common source line 1319. A first metal layer 1350a and a second metal layer 1360a may be stacked sequentially on the upper part of the common source line contact plug 1380. As an example, a region in which the common source line contact plug 1380, the first metal layer 1350a, and the second metal layer 1360a are placed may be defined as the external pad bonding region PA.

I/O pads 1205 and 1305 may be formed in the external pad bonding region PA. A lower insulating film 1201 that covers the lower face of the first substrate 1210 may be formed below the first substrate 1210, and the first I/O pad 1205 may be formed on the lower insulating film 1201. The first I/O pad 1205 may be connected to at least one of a plurality of circuit elements 1220a, 1220b, and 1220c placed in the peripheral circuit region PERI through the first I/O contact plug 1203, and may be separated from the first substrate 1210 by the lower insulating film 1201. A side insulating film may be formed between the first I/O contact plug 1203 and the first substrate 1210, and may electrically separate the first I/O contact plug 1203 and the first substrate 1210.

An upper insulating film 1301 that covers the upper face of the second substrate 1310 may be formed above the second substrate 1310. A second I/O pad 1305 may be formed on the upper insulating film 1301. The second I/O pad 1305 may be connected to at least one of a plurality of circuit elements 1220a, 1220b, and 1220c in the peripheral circuit region PERI through the second I/O contact plug 1303.

In some example embodiments, the second substrate 1310, the common source line 1320 and the like may not be formed in the region in which the second I/O contact plug 1303 is formed. Also, the second I/O pad 1305 may not overlap the word lines 1330 in the third direction z. Referring to FIG. 14, the second I/O contact plug 1303 is separated from the second substrate 1310 in a direction parallel to the upper face of the second substrate 1310, and may penetrate the interlayer insulation layer 1315 of the cell region CELL to be connected to the second I/O pad 1305.

In some example embodiments, the first I/O pad 1205 and the second I/O pad 1305 may be selectively formed. As an example, the non-volatile memory 300 according to some example embodiments may include only the first I/O pad 1205 on the first substrate 1210, or may include only the second I/O pad 1305 on the second substrate 1310. Alternatively, the non-volatile memory 300 may include both the first I/O pad 1205 and the second I/O pad 1305.

A metal pattern of the uppermost metal layer may exist as a dummy pattern in each of the external pad bonding region PA and the bit line bonding region BLBA included in the cell region CELL and the peripheral circuit region PERI, or the uppermost metal layer may be omitted.

In the non-volatile memory 300 according to some example embodiments, a lower metal pattern 1273a having the same shape as the upper metal pattern 1372a of the cell region CELL may be formed on the uppermost metal layer of the peripheral circuit region PERI, to correspond to the upper metal pattern 1372a formed in the uppermost metal layer of the cell region CELL, in the external pad bonding region PA. The lower metal pattern 1273a formed on the uppermost metal layer of the peripheral circuit region PERI may not be connected to another contact in the peripheral circuit region PERI. Similarly, an upper metal pattern having the same shape as the lower metal pattern of the peripheral circuit region PERI may be formed on the upper metal layer of the cell region CELL, to correspond to the lower metal pattern formed in the uppermost metal layer of the peripheral circuit region PERI, in the external pad bonding region PA.

Lower bonding metals 1271b and 1272b may be formed on the second metal layer 1240b of the word line bonding region WLBA. In the word line bonding region WLBA, the lower bonding metals 1271b and 1272b of the peripheral circuit region PERI may be electrically connected to the upper bonding metals 1371b and 1372b of the cell region CELL by the bonding way.

In the bit line bonding region BLBA, an upper metal pattern 1392 having the same shape as the lower metal pattern 1252 of the peripheral circuit region PERI may be formed on the uppermost metal layer of the cell region CELL, to correspond to the lower metal pattern 1252 formed on the uppermost metal layer of the peripheral circuit region PERI. No contact may be formed on the upper metal pattern 1392 formed on the uppermost metal layer of the cell region CELL.

Figure 15:
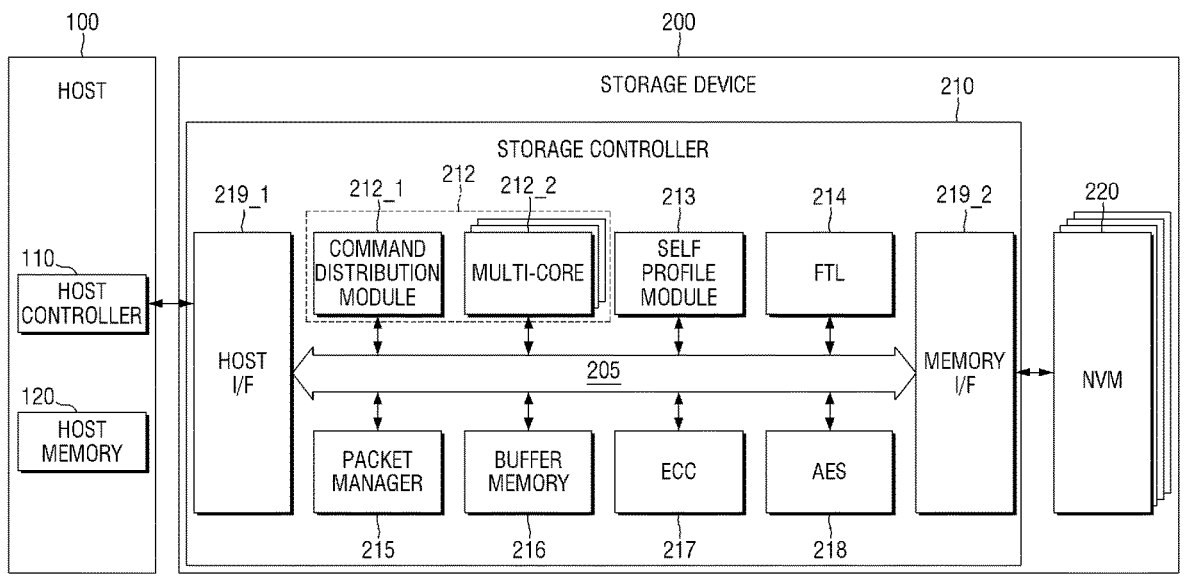
FIG. 15 is a block diagram for explaining a storage system according to some other example embodiments.

FIG. 15 is a block diagram for explaining a storage system according to some other example embodiments. Points different from those described referring to FIGS. 1 to 14 will be mainly explained.

Referring to FIG. 15, in a storage system 3 according to some other example embodiments, a command distribution module 212_1 may be implemented as software such as application and firmware executed on the storage device 200. Accordingly, any one of the plurality of cores 212 may be implemented as the command distribution module 212_1.

Figure 16:
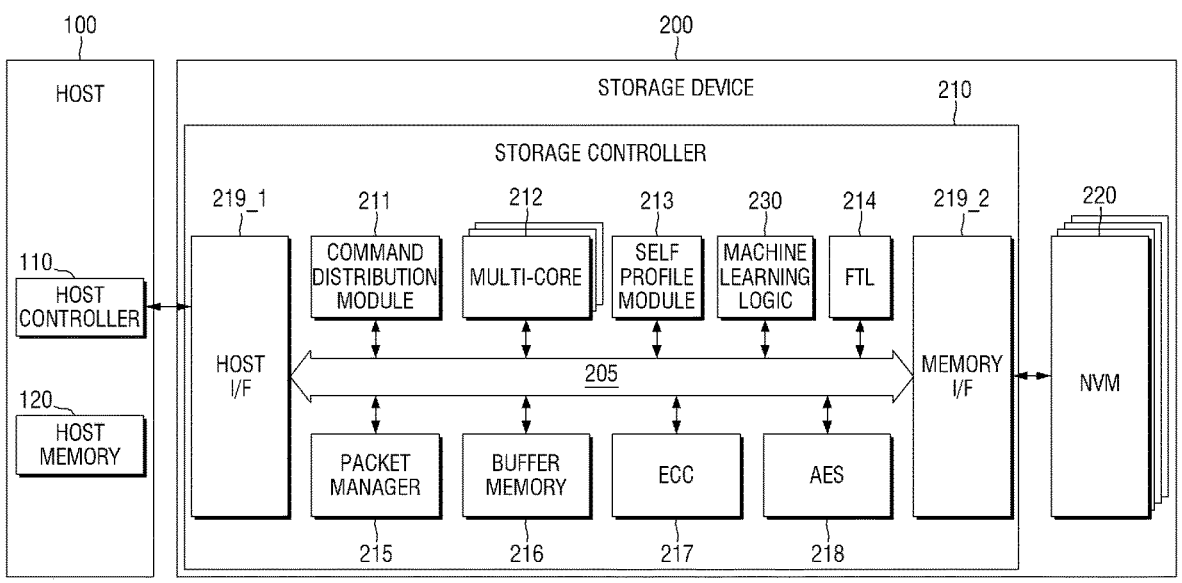
FIG. 16 is a block diagram for explaining a storage system according to some other example embodiments.

FIG. 16 is a block diagram for explaining a storage system according to some other example embodiments. Points different from those described referring to FIGS. 1 to 14 will be mainly explained.

Referring to FIG. 16, a storage system 4 according to some other example embodiments may further include a machine learning logic 230.

The machine learning logic 230 may analyze the pattern of the I/O commands provided from the host 100, by performing the machine learning. The machine learning logic 230 may set the state of the command distribution module 211 on the basis of the analyzed results.

For example, the machine learning logic 230 may hourly analyze the pattern in which the I/O commands are provided from the host 100. As a result, the machine learning logic 230 may hourly set the command distribution module 211 to an appropriate state. Therefore, the state of the command distribution module 211 may be set in advance according to the operation of the host 100, and the storage system 4 according to some other example embodiments may more efficiently process commands provided from the host 100 accordingly.

Although the machine learning logic 230 may be included inside the storage controller 210, the present disclosure is not limited thereto, and the machine learning logic 230 may be implemented inside the storage system 4 as a configuration distinct from the storage controller 210.

Figure 17:
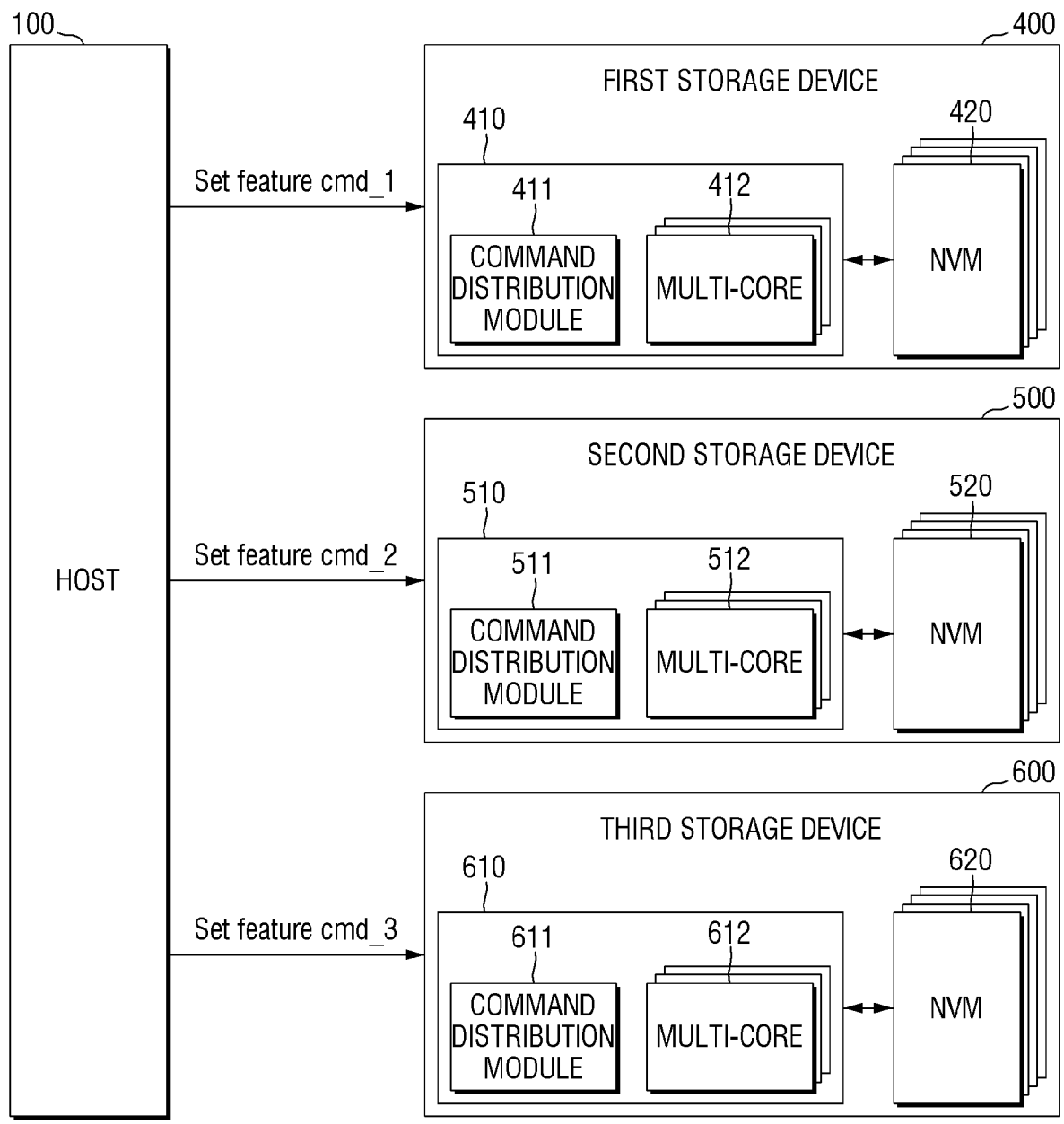
FIGS. 17 to 19 are block diagrams for explaining the operation of the storage system according to some other example embodiments.
Figure 18:
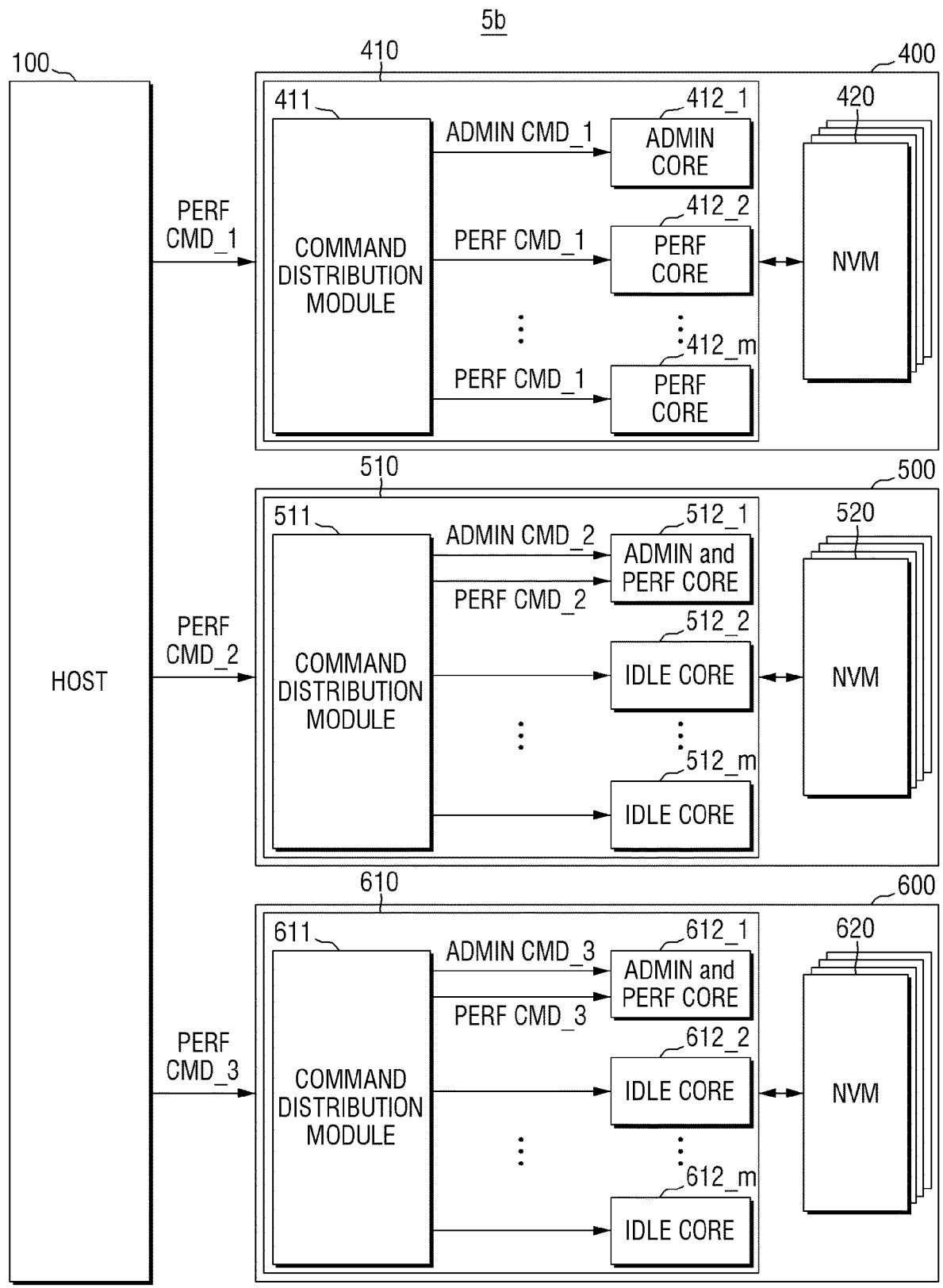
Figure 19:
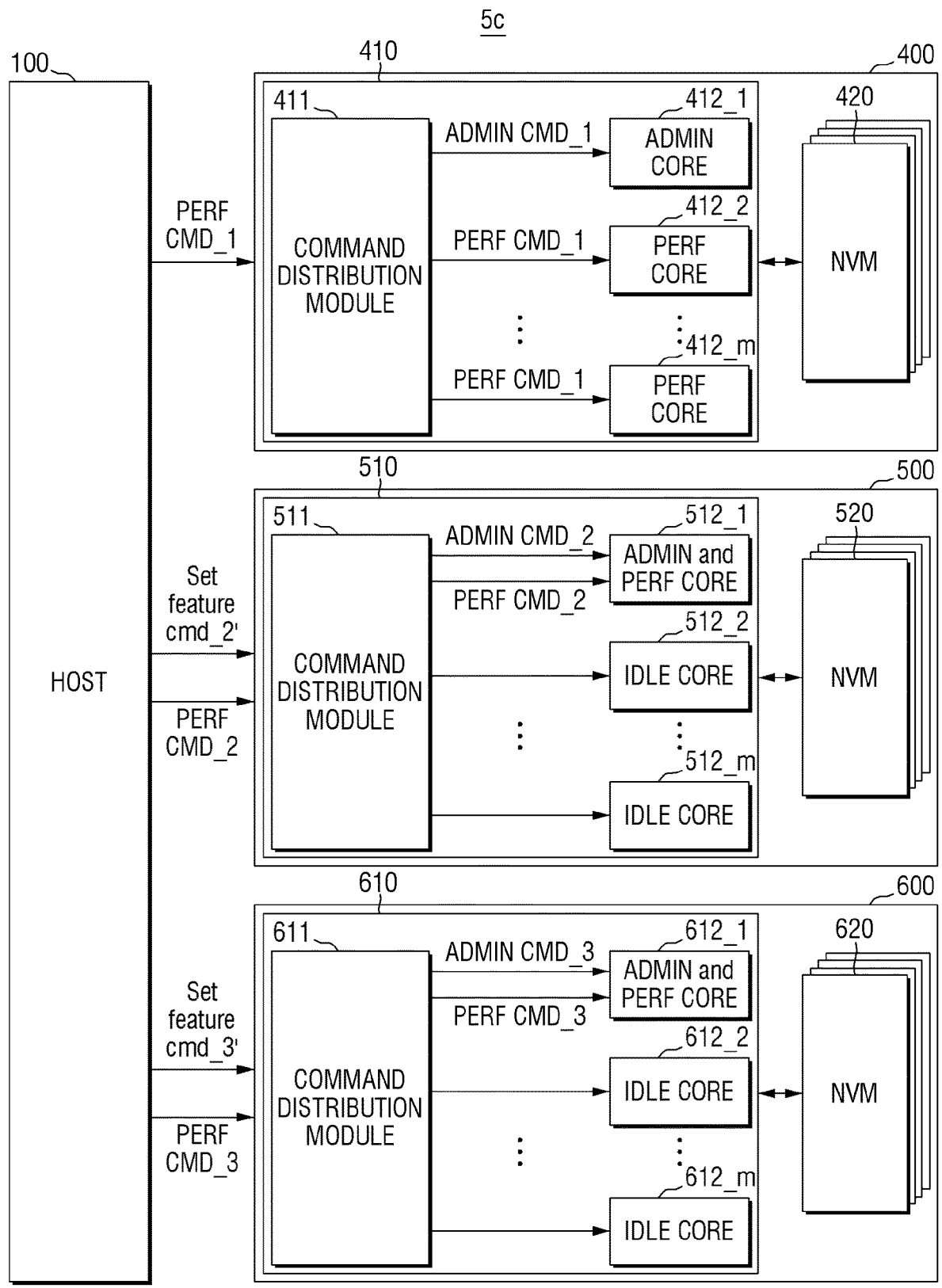

FIGS. 17, 18, and 19 are block diagrams for explaining the operation of the storage system according to some other example embodiments. Points different from those described referring to FIGS. 1 to 14 will be mainly explained.

Referring to FIG. 17, a storage system 5a according to some other example embodiments may include a host 100 and a plurality of storage devices 400, 500, and 600.

The host 100 may provide the plurality of storage devices 400, 500, and 600 with the set commands (Set feature cmd_1, Set feature cmd_2, and Set feature cmd_3) depending on the usage of each of the storage devices 400, 500, and 600. At least some of the set commands (Set feature cmd_1, Set feature cmd_2, and Set feature cmd_3) may include different states and may include the same state.

For example, the host 100 may use the second storage device 500 as a backup storage device of the first storage device 400, and may use the third storage device 600 as a preliminary storage device of the first storage device 400. Accordingly, the host 100 may provide a first set command (Set feature cmd_1) including a normal state to the first storage device 400, provide a second set command (Set feature cmd_2) including a low power state to the second storage device 500, and provide a third set command (Set feature cmd_3) including a low power state to the third storage device 600. The first set command may have a format according to the host interface.

Referring to FIG. 18, in a storage system 5b, a first command distribution module 411 of the first storage device 400 may be set to the normal state, a second command distribution module 511 of the second storage device 500, and a third command distribution module 611 of the third storage device 600 may be set to the low power state. As a result, the plurality of first cores of the first storage device 400 may be divided into a core 412_1 to which ADMIN command (ADMIN CMD_1) is distributed, and cores 412_2 to 412_n to which I/O command (PERF CMD_1) is distributed. The plurality of second cores of the second storage device 500 may be divided into a core 512_1 to which the ADMIN command (ADMIN CMD_2) and the I/O command (PERF CMD_2) are distributed, and cores 512_2 to 512_n to which no command is distributed. The plurality of third cores of the third storage device 600 may be divided into a core 612_1 to which the ADMIN command (ADMIN CMD_3) and the I/O command (PERF CMD_3) are distributed, and cores 612_2 to 612_n to which no command is distributed. Thus, the second storage device 500 and the third storage device 600 may be maintained in the standby state to reduce power consumption.

Referring to FIG. 19, when the backup is to be performed, the host 100 may provide the second set command (Set feature cmd_2) including the maximum operating state to the second storage device 500, and provide the third set command (Set feature cmd_3) including the maximum operating state to the third storage device 600. In a storage system 5c, the second command distribution module 511 and the third command distribution module 611 may be set to the maximum operating state. Accordingly, the second storage device 500 and the third storage device 600 may perform a backup operation more quickly.

In the storage system 5c according to some example embodiments, the host 100 may use the storage devices 400, 500, and 600 in consideration of the purpose of the host 100 for using the storage devices 400, 500, and 600, the state of the host 100, and the like. Accordingly, the storage devices 400, 500, and 600 may be operated more efficiently.

Figure 20:
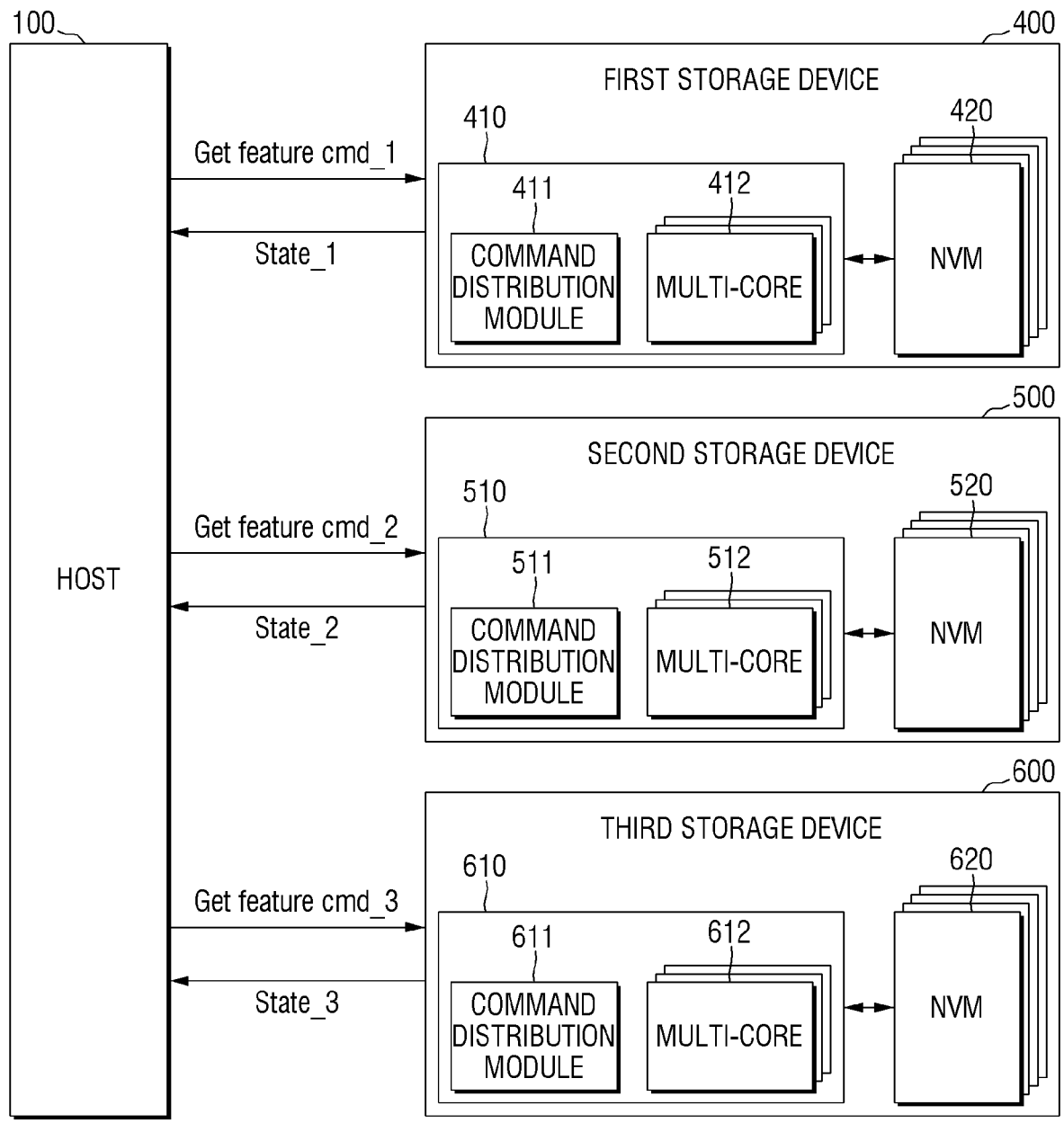
FIG. 20 is a block diagram for explaining the operation of the storage system according to some other example embodiments.
Figure 22:
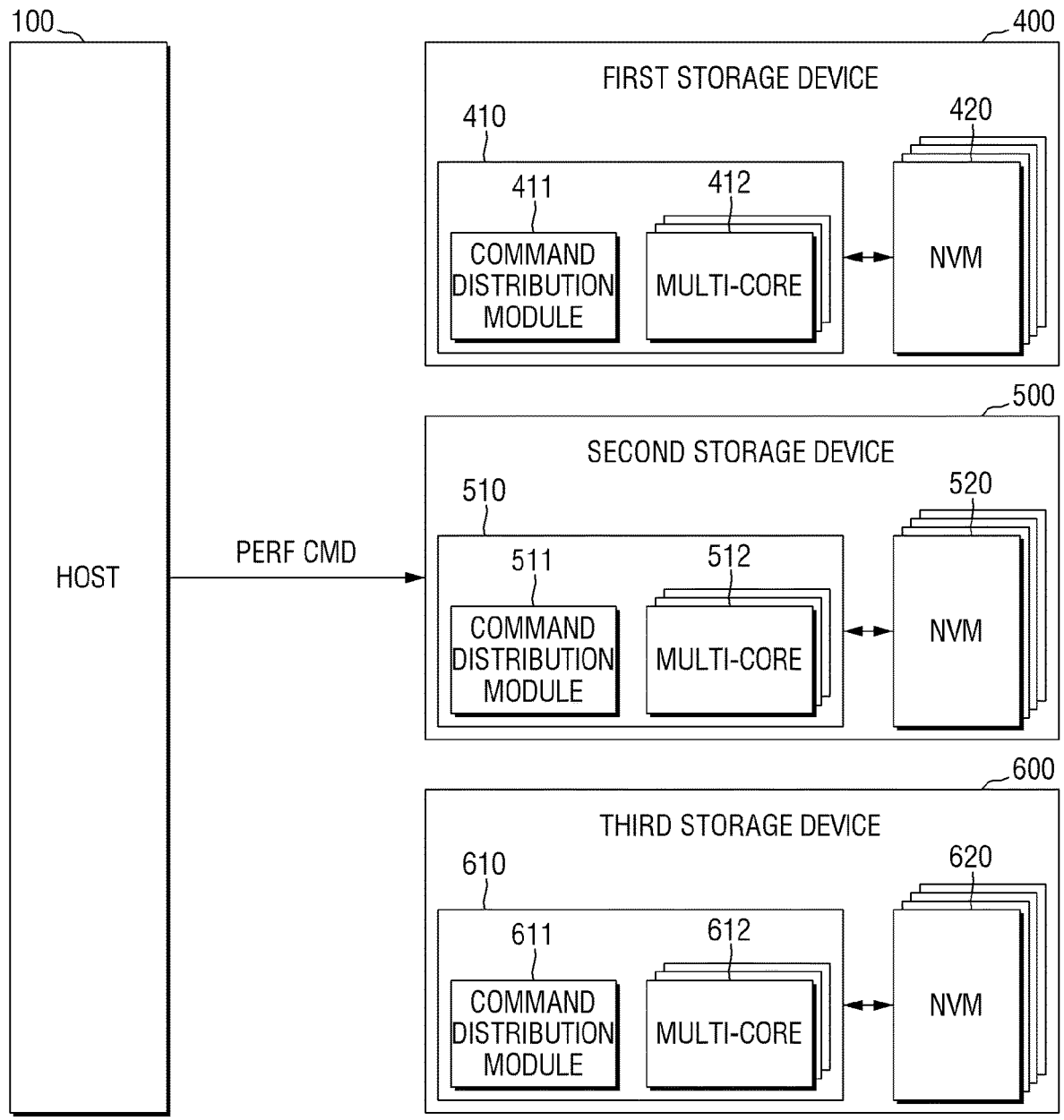
FIG. 22 is a block diagram for explaining the operation of the storage system according to some other example embodiments.

FIGS. 20, 21, and 22 are block diagrams for explaining the operation of the storage system according to some other example embodiments. FIG. 21 is a diagram for explaining the state command of FIG. 20. Points different from those described referring to FIGS. 1 to 14 will be mainly explained.

Referring to FIG. 20, the host 100 may provide the state commands (Get feature cmd_1, Get feature cmd_2, and Get feature cmd_3) to each of the plurality of storage devices 400, 500, and 600. The state commands (Get feature cmd_1, Get feature cmd_2, and Get feature cmd_3) may be commands that request information from the respective storage devices 400, 500, and 600, and may request information about the states of the command distribution modules 411, 511, and 611.

For example, referring to FIG. 21, when the host interface (219_1 of FIG. 1) is NVMe, the state commands (Get feature cmd_1, Get feature cmd_2, and Get feature cmd_3) may be get feature command 2000. The get feature command 2000 may include a region 2100 that includes a feature identifier. The feature identifier may mean a feature that the host 100 intends to request from the storage device 200. A region 2100 including the feature identifier may include information about the states of the command distribution modules 411, 511, and 611.

In still another example, when the host interface (219_1 of FIG. 1) is SAS, the state command may be a mode sense command. The page code of the mode sense command may include information about the states of the command distribution modules 411, 511, and 611.

In still another example, when the host interface (219_1 of FIG. 1) is SATA, the state command may be a get feature command. A subcommand value of the get feature command may include information about the states of the command distribution modules 411, 511, and 611. The present disclosure is not limited thereto, and the state commands (Get feature cmd_1, Get feature cmd_2, and Get feature cmd_3) may be arbitrary commands that request information about the states of the command distribution modules 411, 511, and 611.

Referring to FIG. 20 again, each of the plurality of storage devices 400, 500, and 600 may provide the states (State_1, State_2, and State_3) to the host 100 depending on the state commands (Get feature cmd_1, Get feature cmd_2, and Get feature cmd_3).

Referring to FIG. 22, the host 100 may provide additional I/O commands (PERF CMD) to any one of the plurality of storage devices 400, 500, and 600 on the basis of the states of the plurality of storage devices 400, 500, and 600. The host 100 may provide the additional I/O commands (PERF CMD) to the second storage device 500 having lower work load or utilization on the basis of the states of the plurality of storage devices 400, 500, and 600.

For example, the first state State_1 and the third state State_3 may be the maximum operating state, and the second state State_2 may be the low power state. The host 100 may provide the additional I/O commands (PERF CMD) to the second storage device 500. Therefore, load due to the additional I/O commands (PERF CMD) may not be applied to the first storage device 400 or the third storage device 600, and the additional I/O commands (PERF CMD) may be provided to the second storage device 500 to more quickly process the additional I/O commands (PERF CMF). Thus, in the storage system 6c according to some example embodiments, additional I/O commands (PERF CMD) may be distributed and processed in consideration of the states of the storage devices 400, 500, and 600.

Figure 23:
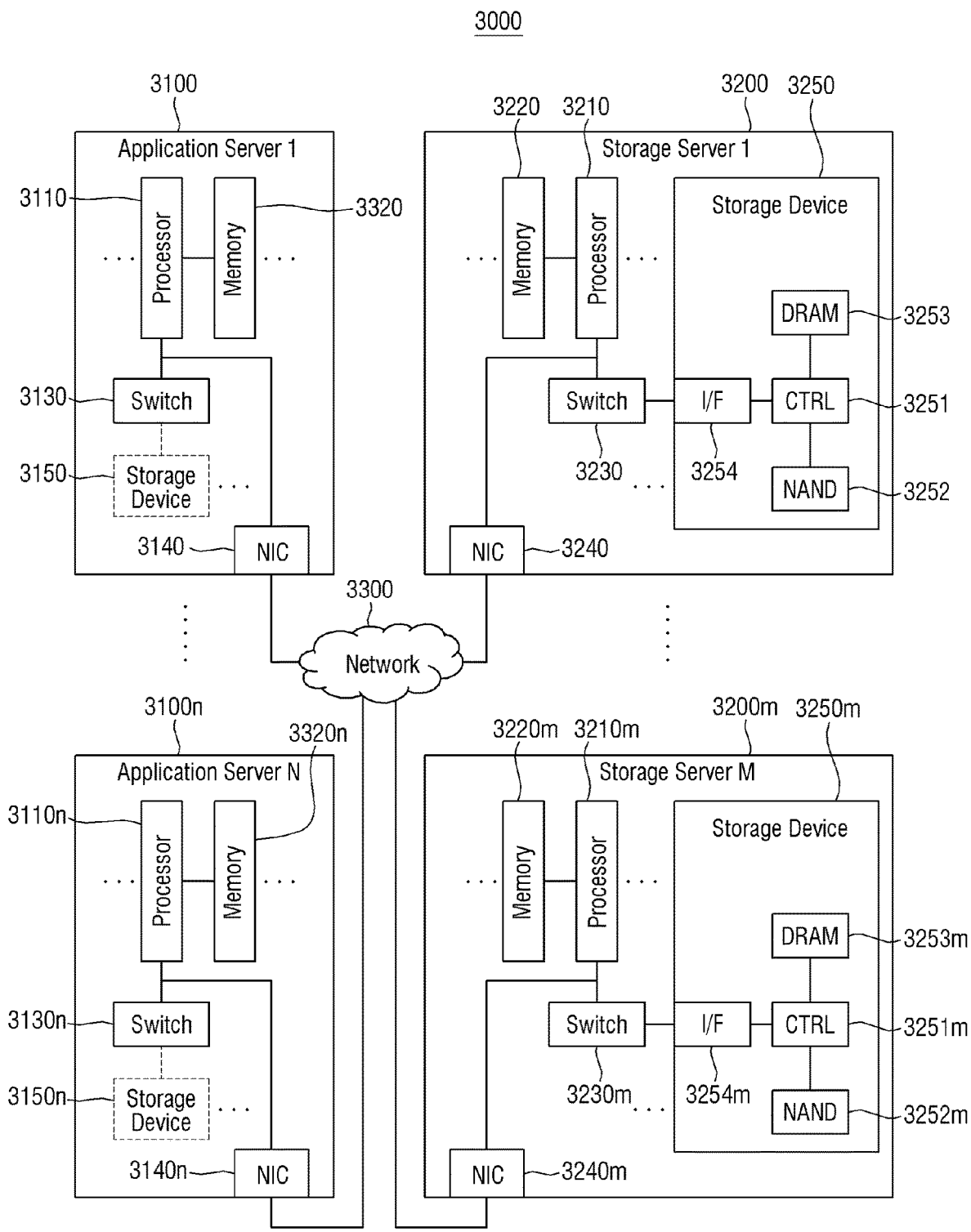
FIG. 23 is a diagram showing a data center to which the storage system according to some other example embodiments is applied.

FIG. 23 is a diagram showing a data center to which the storage system according to some other example embodiments is applied.

Referring to FIG. 23, a data center 3000 may be a facility that collects various data and provides services, and may also be called a data storage center. The data center 3000 may be a system for search engines and database operations, and may be a computing system used by businesses such as banks and government agencies. The data center 3000 may include application servers 3100 to 3100n and storage servers 3200 to 3200m. The number of application servers 3100 to 3100n and the number of storage servers 3200 to 3200m may be variously selected depending on the embodiments, and the number of application servers 3100 to 3100n and the number of storage servers 3200 to 3200m may be different from each other.

The application server 3100 or the storage server 3200 may include at least one of the processors 3110 and 3210 and the memories 3320 and 3220. Taking the storage server 3200 as an example, the processor 3210 may control the overall operation of the storage server 3200, and may access the memory 3220 to execute commands and/or data loaded into the memory 3220. The memory 3220 may be a DDR SDRAM (Double Data Rate Synchronous DRAM), a HBM (High Bandwidth Memory), a HMC (Hybrid Memory Cube), a DIMM (Dual In-line Memory Module), an Optane DIMM or a NVMDIMM (Non-Volatile DIMM). In some example embodiments, the number of processors 3210 and the number of memories 3220 included in the storage server 3200 may be variously selected. In an example embodiment, the processor 3210 and the memory 3220 may provide a processor-memory pair. In an example embodiment, the numbers of processors 3210 and memories 3220 may be different from each other. The processor 3210 may include a single core processor or a multi-core processor. The description of the storage server 3200 may also be similarly applied to the application server 3100. In some example embodiments, the application server 3100 may not include a storage device 3150. The storage server 3200 may include at least one or more storage devices 3250. The number of storage devices 3250 included in the storage server 3200 may be variously selected, depending on the embodiments.

The application servers 3100 to 3100n and the storage servers 3200 to 3200m may communicate with each other through the network 3300. The network 3300 may be implemented using a FC (Fiber Channel), an Ethernet, or the like. FC is a medium used for relatively high-speed data transfer, and an optical switch that provides high performance/high availability may be used. Depending on the access type of the network 3300, the storage servers 3200 to 3200m may be provided as a file storage, a block storage, or an object storage.

In an example embodiment, the network 3300 may be a storage-only network such as a SAN (Storage Area Network). For example, the SAN may be an FC-SAN that uses an FC network and is implemented according to FCP (FC Protocol). In another example, the SAN may be an IP-SAN that uses a TCP/IP network and is implemented according to iSCSI (SCSI over TCP/IP or Internet SCSI) protocol. In another example, the network 3300 may be a general network such as a TCP/IP network. For example, the network 3300 may be implemented according to protocols such as an FCoE (FC over Ethernet), a NAS (Network Attached Storage), and a NVMe-oF (NVMe over Fabrics).

Hereinafter, the application server 3100 and the storage server 3200 will be mainly explained. The explanation of the application server 3100 may also be applied to another application server 3100n, and the explanation of the storage server 3200 may also be applied to another storage server 3200m.

The application server 3100 may store the data requested by a user or a client to store in one of the storage servers 3200 to 3200m through the network 3300. Also, the application server 3100 may obtain data requested by the user or client to read from one of the storage servers 3200 to 3200m through the network 3300.

The application server 3100 according to some example embodiments may provide a set command to the storage servers 3200 to 3200m according to the circumstances of the application server 3100 or requirements. The states of the storage servers 3200 to 3200m may be set depending on the set command. In other example embodiments, the application server 3100 may provide the state command to the storage servers 3200 to 3200m to read the state of the storage servers. The application server 3100 may provide the additional I/O commands to at least one of the storage servers 3200 to 3200m on the basis of the states of the storage servers 3200 to 3200m.

In an example embodiment, the application server 3100 may be implemented as a Web server, a DBMS (Database Management System), or the like.

The application server 3100 may access the memory 3320n or the storage device 3150n included in another application server 3100n through the network 3300, and may access the memories 3220 to 3220m or the storage devices 3250 to 3250m included in the storage servers 3200 to 3200m through the network 3300. Thus, the application server 3100 may perform various operations on the data stored in the application servers 3100 to 3100n and/or the storage servers 3200 to 3200m. For example, the application server 3100 may execute commands for moving or replicating the data between the application servers 3100 to 3100n and/or the storage servers 3200 to 3200m. The data may be moved from the storage devices 3250 to 3250m of the storage servers 3200 to 3200m via the memories 3220 to 3220m of the storage servers 3200 to 3200m, or directly to the memories 3320 to 3320n of the application servers 3100 to 3100n. Data moving through the network 3300 may be data encrypted for security and privacy.

Taking the storage server 3200 as an example, an interface 3254 may provide a physical connection between the processor 3210 and the controller 3251, and a physical connection between the NIC 3240 and the controller 3251. For example, the interface 3254 may be implemented in a DAS (Direct Attached Storage) type in which the storage device 3250 is directly connected with a dedicated cable. Also, e.g., the interface 3254 may be implemented as various interface types such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), a SD (secure digital) card, a MMC (multi-media card), an eMMC (embedded multi-media card), a UFS (Universal Flash Storage), an eUFS (embedded Universal Flash Storage), and a CF (compact flash) card interface.

The storage server 3200 may further include a switch 3230 and the NIC 3240. The switch 3230 may selectively connect the processor 3210 and the storage device 3250 or may selectively connect the NIC 3240 and the storage device 3250, according to the control of the processor 3210.

In an example embodiment, the NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a DSP, a host bus interface, and the like, and may be connected to the processor 3210 and/or the switch 3230, or the like through the host bus interface. The host bus interface may also be implemented as one of the examples of the aforementioned interface 3254. In an example embodiment, the NIC 3240 may also be integrated with at least one of the processor 3210, the switch 3230, and the storage device 3250.

In the storage servers 3200 to 3200m or the application servers 3100 to 3100n, the processors may transmit the commands to the storage devices 3150 to 3150n, and 3250 to 3250m or the memories 3320 to 3320n, and 3220 to 3220m to program or read the data. The data may be data in which error is corrected through an ECC engine. The data may be data subjected to data bus inversion (DBI) or data masking (DM) process, and may include CRC (Cyclic Redundancy Code) information. The data may be data encrypted for security and privacy.

The storage devices 3150 to 3150n, and 3250 to 3250m may transmit control signals and command/address signals to the NAND flash memory devices 3252 to 3252m in response to the read commands received from the processor. Accordingly, when reading the data from the NAND flash memory devices 3252 to 3252m, the RE (Read Enable) signal may be input as the data output control signal to serve to output the data to the DQ bus. A DQS (Data Strobe) may be generated, using the RE signal. The commands and address signals may be latched into the page buffer, depending on a rising edge or a falling edge of WE (Write Enable) signal.

The controller 3251 may generally control the operation of the storage device 3250. In an example embodiment, the controller 3251 may include a SRAM (Static Random Access Memory). The controller 3251 may write data in the NAND flash memory device 3252 in response to the write command, or may read data from the NAND flash memory device 3252 in response to the read command. For example, the write command and/or the read command may be provided from the processor 3210 in the storage server 3200, the processor 3210m in another storage server 3200m, or the processors 3110 to 3110n in the application servers 3100 to 3100n.

The controller 3251 according to some example embodiments may include a plurality of cores. The state of the controller 3251 may be set depending on the set commands provided from the application servers 3100 and 3100n, and the write command and/or the read command may be distributed into a plurality of cores depending on the set state.

The DRAM 3253 may temporarily store (buffer) the data to be written to the NAND flash 3252 or data that is read from the NAND flash 3252. Also, the DRAM 3253 may also store metadata. The metadata may be the data generated by the controller 3251 to manage the user data and the NAND flash 3252. The storage device 3250 may include an SE (Secure Element) for security or privacy.

By way of summation and review, a method of controlling a multi-core processor should efficiently operate a storage system depending on a variety of purposes.

As described above, embodiments may provide a storage device that more efficiently distributes commands to a plurality of cores. Embodiments may also provide a storage system including a storage device that more efficiently distributes commands to a plurality of cores.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A storage device, comprising:
a non-volatile memory; and
a storage controller including:
  a plurality of cores including at least one first core and at least one second core that are different from each other;
  a host interface configured to receive a first set command, an input/output (I/O) command including a write command and a read command, and an administrative (ADMIN) command from a host;
  a flash translation layer configured to perform at least one more function among address mapping, wear-leveling, and garbage collection, wherein a write operation and a read operation instructed by the I/O command on the non-volatile memory are controlled by executing the flash translation layer by the plurality of cores; and
  a command distribution module configured to
  be set to one of a plurality of states according to the first set command including information about state of the command distribution module from the host and distribute the I/O command from the host and the ADMIN command from the host to the plurality of cores according to the set state, wherein a definition of states and a number of states depend on the first set command of the host,
wherein the at least one first core is configured to perform the write operation and the read operation instructed by the I/O command on the non-volatile memory; and the at least one second core is configured to perform an operation instructed by the ADMIN command to manage the storage device.

2. The storage device as claimed in claim 1, wherein:
while in at least one state of the plurality of states, the command distribution module is configured to distribute the I/O command to the at least one first core, and not distribute the I/O command to the at least one second core.

3. The storage device as claimed in claim 2, wherein while in the at least one state of the plurality of states, the command distribution module is configured to distribute the ADMIN command to the at least one second core, and not distribute the ADMIN command to the at least one first core.

4. The storage device as claimed in claim 3, wherein the ADMIN command includes a read command of metadata and a write command of metadata.

5. The storage device as claimed in claim 2, wherein while in the at least one state of the plurality of states, the command distribution module is configured to not distribute the ADMIN command to the plurality of cores.

6. The storage device as claimed in claim 1, wherein:
the first set command is a command that has a format according to the host interface, and includes a feature that the host is to set among features of the storage device, and
the first state is included in the features of the storage device.

7. The storage device as claimed in claim 1, further comprising:
a self profile module configured to provide a second set command including information about state of the command distribution module,
wherein
the command distribution module is configured to be set to one of the plurality of states according to the second set command and distribute the I/O command from the host and the ADMIN command from the host to the plurality of cores according to the set state according to the second set command.

8. The storage device as claimed in claim 7, wherein the self profile module is configured to monitor a type of the I/O command, a latency of the I/O command, a dimension of the I/O command, a queue depth of the plurality of cores, or an interval at which the I/O command is provided from the host, to generate the second set command.

9. The storage device as claimed in claim 1, further comprising:
a self profile module configured to provide a second set command including information about state of the command distribution module,
wherein the command distribution module is configured to be set to the state according to the first set command, when the first set command and the second set command are received by the command distribution module at the same time.

10. A storage device, comprising:
a non-volatile memory; and
a storage controller including
a plurality of cores including a first core and a second core that are different from each other,
a host interface configured to receive a first set command, an input/output (I/O) command including a write command and a read command, and an administrative (ADMIN) command from a host, and
a flash translation layer configured to perform at least one more function among address mapping, wear-leveling, and garbage collection, and
configured to
be set responsive to receipt of a set command to a state, indicated in the set command, of a predetermined plurality of states, each state of the plurality of states predefines to which of the plurality of cores the storage controller distributes the I/O command from the host and the ADMIN command from the host, the plurality of states including a first state,
responsive to receipt of a first set command provided from the host and indicating the first state, at a first time point, set the storage device to the first state so as to
responsive to receipt of the I/O command provided from the host, perform an operation instructed by the I/O command on the non-volatile memory, and
responsive to receipt of the ADMIN command provided from the host, not perform an operation instructed by the ADMIN command to manage the storage device, and
wherein a write operation or a read operation among operations instructed by the I/O command on the non-volatile memory is controlled by the plurality of cores executing the flash translation layer.

11. The storage device as claimed in claim 10, wherein the first set command is a command that has a format according to the host interface and includes a feature that the host is to set among features of the storage device.

12. The storage device as claimed in claim 10, wherein the storage controller is configured to:
responsive to receipt of a second set command that is different from the first set command from the host at a second time point later than the first time point, set the storage device to a second state so as to
responsive to receipt of the I/O command provided from the host, perform the operation instructed by the I/O command on the non-volatile memory, and
responsive to receipt of the ADMIN command provided from the host, perform the operation instructed by the ADMIN command to manage the storage device.

13. The storage device as claimed in claim 12, wherein:
the storage controller is configured to control the non-volatile memory,
the first core is configured to perform an operation instructed by the I/O command on the non-volatile memory, and
the second core is configured to perform an operation instructed by the ADMIN command on the non-volatile memory.

14. The storage device as claimed in claim 13, wherein:
the storage controller is configured to control the non-volatile memory,
the first core is configured to perform an operation instructed by the read command on the non-volatile memory, and
the second core is configured to perform an operation instructed by the write command on the non-volatile memory.

15. A storage system, comprising:
a host;
a first storage device that includes:
a first non-volatile memory, and
a first storage controller including a plurality of first cores including a third core and a fourth core that are different from each other.
a first host interface configured to receive a first state command, a first administrative (ADMIN) command, and a first input/output (I/O) command from the host, and
a first flash translation layer configured to perform at least one more function among address mapping, wear-leveling, and garbage collection, and
configured to, responsive to the first state command provided from the host, output state information indicating a first state of the first storage device, the first state including information that predefines to which of the plurality of first cores the first ADMIN command to manage the first storage device and the first I/O command to perform an operation on the first non-volatile memory provided from the host are distributed,
a write operation or a read operation among operations instructed by the first I/O command on the first non-volatile memory is controlled by the plurality of first cores executing the first flash translation layer; and
a second storage device that includes:
a second non-volatile memory, and
a second storage controller including
a plurality of second cores including a fifth core and a sixth core that are different from each other,
a second host interface configured to receive a second state command, a second ADMIN command, and a second I/O command from the host, and
a second flash translation layer configured to perform at least one more function among address mapping, wear-leveling, and garbage collection, and
configured to, responsive to the second state command provided from the host, output state information indicating a second state of the second storage device, the second state including information that predefines to which of the plurality of second cores the second ADMIN command to manage the second storage device and the second I/O command to perform an operation on the second non-volatile memory provided from the host are distributed,
a write operation or a read operation among operations instructed by the second I/O command on the second non-volatile memory is controlled by the plurality of second cores executing the second flash translation layer,
wherein the host is configured to determine which of the first storage device and the second storage device to use for a third I/O command on a basis of the first state and the second state, and provide the third I/O command to the determined one of the first storage device and the second storage device.

16. The storage system as claimed in claim 15, wherein, the host is configured to, responsive to
the first state including state information indicating a predetermined first state in which the first ADMIN command is not provided to the plurality of first cores and the first I/O command is distributed to the plurality of first cores, and
the second state including state information indicating a predetermined second state in which the second ADMIN command is distributed to one of the plurality of second cores and the second I/O command is distributed to one of the plurality of second cores,
provide the third I/O command to the second storage device.

17. The storage system as claimed in claim 15, wherein: the host is configured to, responsive to
the first state including state information indicating a predetermined first state in which the first ADMIN command is provided to the first core and the first I/O command is distributed to the fourth core, and
the second state including state information indicating a predetermined second state in which the second ADMIN command is distributed to one of the plurality of second cores and the second I/O command is distributed to one of the plurality of second cores,
provide the third I/O command to the second storage device.

18. The storage system as claimed in claim 15, wherein:
the first state command is a command that has a format according to the first host interface and includes a feature requested by the host among the features of the first storage device, and
the second state command is a command that has a format according to the second host interface and includes a feature requested by the host among the features of the second storage device.

* * * * *